(12) United States Patent
Badigannavar

(10) Patent No.: US 11,093,909 B1
(45) Date of Patent: Aug. 17, 2021

(54) SYSTEM AND METHODS FOR NEGOTIATING TICKET TRANSFER

(71) Applicant: StubHub, Inc., San Francisco, CA (US)

(72) Inventor: Vijet Siddalinga Badigannavar, Union City, CA (US)

(73) Assignee: StubHub, Inc., San Francisco, CA (US)

( * ) Notice: Subject to any disclaimer, the term of this patent is extended or adjusted under 35 U.S.C. 154(b) by 0 days.

(21) Appl. No.: 16/810,421

(22) Filed: Mar. 5, 2020

(51) Int. Cl.
*G06Q 20/04* (2012.01)
*G06Q 30/02* (2012.01)

(52) U.S. Cl.
CPC ..... *G06Q 20/0457* (2013.01); *G06Q 30/0208* (2013.01)

(58) Field of Classification Search
CPC .............. G06Q 20/0457; G06Q 30/0208
USPC ............ 235/382.5; 705/5, 7.19, 26.1, 80
See application file for complete search history.

(56) References Cited

U.S. PATENT DOCUMENTS

| | | | |
|---|---|---|---|
| 5,333,257 | A | 7/1994 | Merrill et al. |
| 6,240,396 | B1 | 5/2001 | Walker et al. |
| 7,250,945 | B1 | 7/2007 | Scaman et al. |
| 7,412,442 | B1 | 8/2008 | Vadon et al. |
| 7,562,051 | B1 | 7/2009 | Donner |
| 7,584,123 | B1 | 9/2009 | Karonis et al. |
| 7,778,853 | B2 | 8/2010 | Sussman et al. |
| 8,024,234 | B1 | 9/2011 | Thomas et al. |
| 8,090,603 | B2 | 1/2012 | Payne et al. |
| 8,126,748 | B2 | 2/2012 | Sunshine et al. |
| 9,600,781 | B2 | 3/2017 | Zamer |
| 10,332,040 | B2 | 6/2019 | Zamer |
| 10,614,384 | B2 | 4/2020 | Ngo et al. |
| 2002/0077931 | A1 | 6/2002 | Henrion et al. |
| 2002/0082879 | A1 | 6/2002 | Miller et al. |

(Continued)

FOREIGN PATENT DOCUMENTS

| | | |
|---|---|---|
| WO | 00/65506 A2 | 11/2000 |
| WO | 2002069078 A2 | 9/2002 |

(Continued)

OTHER PUBLICATIONS

U.S. Office Action in U.S. Appl. No. 13/966,649, dated Dec. 24, 2014, 19 pgs.

(Continued)

*Primary Examiner* — Allyson N Trail
(74) *Attorney, Agent, or Firm* — McDermott Will & Emery LLP

(57) ABSTRACT

A method and system which enables users of a ticketing marketplace to exchange tickets in order obtain groups of adjacent seats for an event. The method may include obtaining data associated with a first transaction for acquiring a first ticket by a first user, obtaining a first indication of willingness of the first user to negotiate exchange of the first ticket, and determining a set of exchange terms. A second user may then request to obtain a second ticket corresponding to a seat adjacent to a seat corresponding to the first ticket obtained by the first user, and exchange, with the first user, a third ticket for the first ticket. Upon a determination that the third ticket satisfies the set of exchange terms, the first ticket obtained by the first user is automatically transferred to the second user and a third ticket is automatically transferred to the first user.

20 Claims, 13 Drawing Sheets

(56) References Cited

U.S. PATENT DOCUMENTS

| | | |
|---|---|---|
| 2002/0082969 A1 | 6/2002 | O'Keeffe et al. |
| 2003/0061147 A1* | 3/2003 | Fluhr ............... G06Q 30/0615 705/37 |
| 2003/0066883 A1 | 4/2003 | Yuan |
| 2003/0069827 A1 | 4/2003 | Gathman et al. |
| 2003/0164925 A1 | 9/2003 | Kutner |
| 2003/0202017 A1 | 10/2003 | Fukuoka et al. |
| 2003/0236736 A1 | 12/2003 | Harmon et al. |
| 2004/0006497 A1* | 1/2004 | Nestor ............... G06Q 20/045 705/5 |
| 2004/0230440 A1 | 11/2004 | Malhotra |
| 2005/0004820 A1 | 1/2005 | LeMieux |
| 2005/0015303 A1* | 1/2005 | Dubin ............... G06Q 30/0625 705/5 |
| 2005/0128304 A1 | 6/2005 | Manasseh et al. |
| 2005/0131658 A1 | 6/2005 | Mei et al. |
| 2006/0116916 A1 | 6/2006 | Bowman et al. |
| 2006/0116930 A1 | 6/2006 | Goldstein |
| 2007/0033110 A1 | 2/2007 | Philipp et al. |
| 2007/0064208 A1 | 3/2007 | Giegerich |
| 2007/0276595 A1 | 11/2007 | Lewinson et al. |
| 2008/0004917 A1 | 1/2008 | Mortimore |
| 2008/0082355 A1 | 4/2008 | Leach et al. |
| 2008/0103934 A1 | 5/2008 | Gibson et al. |
| 2008/0109322 A1 | 5/2008 | Leach et al. |
| 2008/0162211 A1 | 7/2008 | Addington |
| 2008/0188308 A1 | 8/2008 | Shepherd |
| 2008/0189147 A1 | 8/2008 | Bartlett |
| 2008/0189747 A1 | 8/2008 | DiFonzo et al. |
| 2008/0255889 A1 | 10/2008 | Geisler et al. |
| 2008/0281644 A1 | 11/2008 | Payne |
| 2009/0006143 A1 | 1/2009 | Orttung et al. |
| 2009/0006373 A1 | 1/2009 | Chakrabarti et al. |
| 2009/0063204 A1 | 3/2009 | Stirlen et al. |
| 2009/0063206 A1 | 3/2009 | Payne et al. |
| 2009/0063207 A1 | 3/2009 | Brodzeller |
| 2009/0204600 A1 | 8/2009 | Kalik et al. |
| 2009/0256839 A1 | 10/2009 | Bastian |
| 2009/0273213 A1 | 11/2009 | Mukherjee |
| 2009/0287687 A1 | 11/2009 | Martire et al. |
| 2010/0057743 A1 | 3/2010 | Pierce |
| 2010/0070888 A1 | 3/2010 | Watabe et al. |
| 2010/0082374 A1 | 4/2010 | Charania et al. |
| 2010/0113072 A1 | 5/2010 | Gibson et al. |
| 2010/0174510 A1 | 7/2010 | Greco |
| 2010/0217679 A1* | 8/2010 | Eckstein ............... G06Q 20/102 705/26.1 |
| 2010/0257002 A1 | 10/2010 | Brett |
| 2010/0287033 A1 | 11/2010 | Mathur |
| 2010/0312587 A1 | 12/2010 | Benson et al. |
| 2011/0093340 A1 | 4/2011 | Kramer et al. |
| 2011/0178827 A1 | 7/2011 | Orenstein |
| 2011/0178891 A1* | 7/2011 | Charriere ............... G06Q 10/02 705/26.2 |
| 2011/0208418 A1 | 8/2011 | Looney et al. |
| 2011/0238454 A1 | 9/2011 | Nestor et al. |
| 2011/0238497 A1 | 9/2011 | Milne |
| 2012/0010911 A1 | 1/2012 | Lele et al. |
| 2012/0010912 A1 | 1/2012 | Lele et al. |
| 2012/0078667 A1 | 3/2012 | Denker et al. |
| 2012/0095862 A1 | 4/2012 | Schiff et al. |
| 2012/0191551 A1 | 7/2012 | Lutnick et al. |
| 2012/0226575 A1 | 9/2012 | Goldberg et al. |
| 2012/0253983 A1 | 10/2012 | Lewin |
| 2012/0323488 A1 | 12/2012 | Callaghan |
| 2012/0323612 A1 | 12/2012 | Callaghan |
| 2013/0054278 A1 | 2/2013 | Sharp |
| 2013/0085790 A1 | 4/2013 | Palmer et al. |
| 2013/0096961 A1* | 4/2013 | Owens ............... G06Q 10/02 705/5 |
| 2013/0124234 A1 | 5/2013 | Nilsson et al. |
| 2013/0159026 A1* | 6/2013 | Rogel ............... G06Q 10/02 705/5 |
| 2013/0268899 A1 | 10/2013 | Valentino |
| 2013/0304521 A1 | 11/2013 | Aird |
| 2013/0317868 A1 | 11/2013 | Diamond et al. |
| 2013/0332525 A1 | 12/2013 | Liu et al. |
| 2014/0019172 A1 | 1/2014 | Oxenham et al. |
| 2014/0025688 A1 | 1/2014 | Andler et al. |
| 2014/0058766 A1 | 2/2014 | Yu et al. |
| 2014/0121967 A1 | 5/2014 | Anbalagan et al. |
| 2014/0129629 A1 | 5/2014 | Savir |
| 2014/0142994 A1 | 5/2014 | Matarazzi et al. |
| 2014/0180734 A1 | 6/2014 | Gibson et al. |
| 2014/0195276 A1 | 7/2014 | Tacchi et al. |
| 2014/0195277 A1 | 7/2014 | Kim |
| 2014/0244321 A1 | 8/2014 | Matsui et al. |
| 2014/0257879 A1 | 9/2014 | Sink et al. |
| 2014/0278591 A1 | 9/2014 | Blecharczyk et al. |
| 2015/0052001 A1 | 2/2015 | Yuan |
| 2015/0061993 A1 | 3/2015 | Itoh |
| 2015/0066546 A1 | 3/2015 | Scarborough et al. |
| 2015/0100354 A1 | 4/2015 | Horowitz et al. |
| 2015/0106134 A1 | 4/2015 | Gandham et al. |
| 2015/0120341 A1 | 4/2015 | Scarborough |
| 2015/0134371 A1 | 5/2015 | Shivakumar et al. |
| 2015/0161525 A1 | 6/2015 | Hirose et al. |
| 2015/0161528 A1 | 6/2015 | Yalcin et al. |
| 2015/0186973 A1 | 7/2015 | Athimoolam |
| 2015/0242763 A1 | 8/2015 | Zamer |
| 2015/0242889 A1 | 8/2015 | Zamer et al. |
| 2015/0242916 A1 | 8/2015 | Godsey |
| 2015/0287119 A1 | 10/2015 | Bhan |
| 2015/0379479 A1* | 12/2015 | Nagaraj ............... H04L 67/306 705/7.19 |
| 2016/0189060 A1 | 6/2016 | Ngo |
| 2016/0232468 A1 | 8/2016 | Meiri et al. |
| 2016/0267404 A1 | 9/2016 | Shicoff et al. |
| 2017/0161784 A1 | 6/2017 | Malik |
| 2017/0193407 A1 | 7/2017 | Zamer |
| 2017/0270587 A1 | 9/2017 | Wolfson et al. |
| 2017/0308903 A1 | 10/2017 | Agranonik et al. |
| 2017/0364835 A1 | 12/2017 | Baker |
| 2017/0364990 A1 | 12/2017 | Vasvani |
| 2017/0372390 A1 | 12/2017 | Lokesh |
| 2018/0018595 A1* | 1/2018 | Scott ............... G06Q 20/0457 |
| 2018/0025402 A1* | 1/2018 | Morris ............... G06Q 30/0611 705/80 |
| 2018/0047085 A1 | 2/2018 | Lokesh et al. |
| 2019/0266521 A1 | 8/2019 | Zamer |
| 2020/0184556 A1* | 6/2020 | Cella ............... G06N 20/00 |

FOREIGN PATENT DOCUMENTS

| | | |
|---|---|---|
| WO | 2015126510 A1 | 8/2015 |
| WO | 2015126512 A1 | 8/2015 |
| WO | 2017218625 A1 | 12/2017 |
| WO | 2017223002 A1 | 12/2017 |

OTHER PUBLICATIONS

U.S. Office Action in U.S. Appl. No. 13/966,649, dated Apr. 28, 2015, 25 pgs.

U.S. Office Action in U.S. Appl. No. 13/966,649, dated Nov. 24, 2015, 25 pgs.

U.S. Office Action in U.S. Appl. No. 13/966,649, dated Apr. 13, 2016, 24 pgs.

U.S. Office Action in U.S. Appl. No. 13/966,649, dated Sep. 15, 2016, 23 pgs.

U.S. Office Action in U.S. Appl. No. 13/966,649, dated Apr. 12, 2017, 29 pgs.

U.S. Office Action in U.S. Appl. No. 13/966,649, dated Sep. 21, 2017, 26 pgs.

U.S. Office Action in U.S. Appl. No. 13/966,649, dated Apr. 24, 2018, 22 pgs.

U.S. Office Action in U.S. Appl. No. 13/966,649, dated Sep. 25, 2018, 11 pgs.

U.S. Office Action in U.S. Appl. No. 13/966,649, dated Jan. 29, 2019, 12 pgs.

U.S. Office Action in U.S. Appl. No. 13/966,649, dated Nov. 10, 2020, 10 pgs.

(56) References Cited

OTHER PUBLICATIONS

U.S. Office Action in U.S. Appl. No. 14/055,750, dated Dec. 1, 2016, 13 pgs.
U.S. Office Action in U.S. Appl. No. 14/055,750, dated Jun. 16, 2017, 14 pgs.
U.S. Office Action in U.S. Appl. No. 14/055,750, dated Nov. 30, 2017, 16 pgs.
U.S. Office Action in U.S. Appl. No. 14/055,750, dated Sep. 7, 2018, 8 pgs.
U.S. Office Action in U.S. Appl. No. 14/055,750, dated Jan. 2, 2019, 8 pgs.
U.S. Office Action in U.S. Appl. No. 14/055,750, dated Jul. 25, 2019, 8 pgs.
U.S. Office Action in U.S. Appl. No. 14/055,750, dated Aug. 1, 2019, 8 pgs.
U.S. Office Action in U.S. Appl. No. 14/055,750, dated Dec. 20, 2019, 8 pgs.
U.S. Office Action in U.S. Appl. No. 14/055,750, dated Jun. 11, 2020, 8 pgs.
U.S. Office Action in U.S. Appl. No. 14/055,750, dated Dec. 14, 2020, 6 pgs.
U.S. Office Action in U.S. Appl. No. 15/190,999, dated Dec. 12, 2019, 14 pgs.
U.S. Office Action in U.S. Appl. No. 15/190,999, dated Jul. 27, 2020, 14 pgs.
U.S. Office Action in U.S. Appl. No. 15/237,601, dated Aug. 2, 2019, 19 pgs.
U.S. Office Action in U.S. Appl. No. 15/237,601, dated Jan. 9, 2020, 22 pgs.
U.S. Office Action in U.S. Appl. No. 15/237,601, dated Jul. 16, 2020, 19 pgs.
U.S. Office Action in U.S. Appl. No. 15/237,601, dated Nov. 4, 2020, 13 pgs.
U.S. Office Action in U.S. Appl. No. 16/411,530, dated Sep. 6, 2019, 11 pgs.
U.S. Office Action in U.S. Appl. No. 16/411,530, dated Mar. 18, 2020, 14 pgs.
U.S. Office Action in U.S. Appl. No. 16/411,530, dated Sep. 23, 2020, 10 pgs.
Extended European Search Report, as issued in connection with European Patent Application No. 17816012.3, dated Dec. 9, 2019, 7 pgs.
International Search Report and Written Opinion, as issued in connection with International Patent Application No. PCT/US2014/069850, dated Mar. 18, 2015, 6 pgs.
International Search Report and Written Opinion, as issued in connection with International Patent Application No. PCT/US2014/070136, dated Mar. 17, 2015, 8 pgs.
International Search Report and Written Opinion, as issued in connection with International Patent Application No. PCT/US2017/037385, dated Aug. 31, 2017, 8 pgs.
International Search Report and Written Opinion, as issued in connection with International Patent Application No. PCT/US2017/038193, dated Sep. 6, 2017, 8 pgs.
RateYourSeats.com, Shaded and Covered Seating at Dodger Stadium, WebArchive copy dated Jul. 20, 2015, https://www.rateyourseats.com/showratings/dodger-stadium-mlb/best-seats/shade-and-cover, 2015, 5 pgs.
USPTO—International Search Report and Written Opinion, as issued in connection with related International Patent Application No. PCT/US2021/020734, dated May 24, 2021, 10 pgs.

* cited by examiner

US 11,093,909 B1

SYSTEM AND METHODS FOR NEGOTIATING TICKET TRANSFER

FIELD

The present disclosure relates generally to electronic commerce, electronic ticketing, and more particularly, to facilitating in the negotiation, exchange, and purchasing of event tickets.

BACKGROUND

Computer systems and networks have facilitated the tasks of buying, selling and transferring goods. For example, global computer networks, such as the Internet, have allowed purchasers to relatively quickly and efficiently seek and purchase goods online. Similarly, global computer networks provide an efficient and cost-effective medium for sellers to advertise, offer, provide, and sell their goods. Electronic commerce companies provide buyers and sellers with online services and the infrastructure to accept orders of goods from remote purchasers, to perform the financial transactions necessary to confirm and complete the sale of goods, to ship or distribute the goods to remote purchasers, and to perform other related logistics.

One example of a market for goods within the realm of electronic commerce is the online ticket market. Various online ticket sellers provide websites through which parties buy and sell tickets online. These tickets are commonly obtained by a user to reserve seats and/or admission for a variety of live events, such as sporting events, concerts, theater events, and other entertainment events. Typically, a buyer looks for available tickets on a ticket marketplace website or other online listing and decides which, if any, of the available tickets are of interest to the buyer for possible purchase.

The subject matter claimed herein is not limited to implementations that solve any disadvantages or that operate only in environments such as those described above. Rather, this background is only provided to illustrate one example technology area where some implementations described herein may be practiced.

SUMMARY

An example method may include obtaining, at a system of a ticketing marketplace, data associated with a first transaction for acquiring a first ticket by a first user. The method also includes obtaining, at the system of the ticketing marketplace from a device associated with the first user, a first indication of willingness of the first user to negotiate exchange of the first ticket and determining, by the system of the ticketing marketplace, a set of exchange terms. The method further includes obtaining, at the system of the ticketing marketplace, a request by a second user to: obtain a second ticket corresponding to a seat adjacent to a seat corresponding to the first ticket obtained by the first user and exchange, with the first user, a third ticket for the first ticket obtained by the first user. The method also includes determining, by the system of the ticketing marketplace, that the third ticket satisfies the set of exchange terms. In response to satisfaction of the set of exchange terms: the method also includes automatically transferring, by the system of the ticketing marketplace, the first ticket obtained by the first user to the second user and automatically transferring the third ticket to the first user.

DETAILED DESCRIPTION

Figure 1:
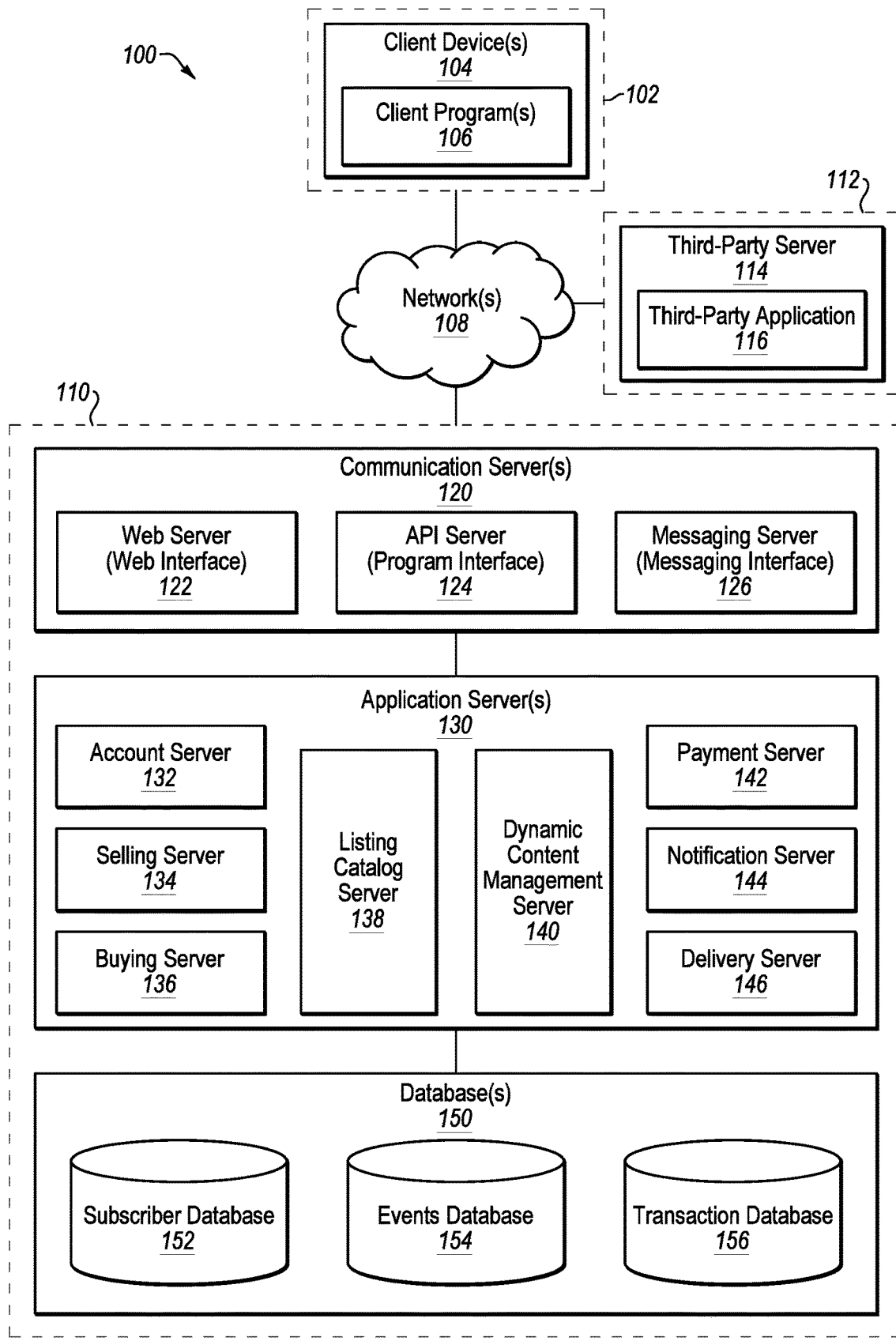
FIG. 1 is a block diagram of an illustrative computing system that is adapted for implementing the selection, purchase, and exchange of tickets for ticketed events according to an embodiment.

Various applications of apparatuses and methods are described in this section. These examples are being provided solely to add context and aid in the understanding of the concepts covered by the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used, and changes may be made without departing from the spirit and scope of the invention.

Devices, systems and methods are provided for performing activities related to the online sale, purchase, resale, flipping, and swapping of tickets to ticketed events. In various particular embodiments, the devices, systems or methods may involve one or more devices in communication over a network. Such devices, systems, and methods may facilitate the selection, negotiation for exchange, transfer, and purchase of tickets to various ticketed events and exchanging goods or activities associated with purchased tickets.

One difficulty with purchasing tickets to ticketed event is a tendency as tickets are sold for there to be a large number of single or small groups of tickets still available for purchase in more desirable seating sections. As a result, it may be difficult to obtain larger groups of tickets in the desired section. Often, a potential purchaser is forced to choose between dividing their group into smaller groups so as to correspond to the smaller groups of available tickets and sitting separately at an event, or, if available, obtaining tickets in a less desirable seating section so as to ensure that the larger group can obtain seats which allow them to sit together. Such a scenario also disadvantages the ticket seller, who may be left with single tickets which are difficult to sell or which only sell at a significant discount.

Devices, systems and methods described in this disclosure relate to ticket exchanging activities (sometimes referred to herein as ticket swapping, ticket flipping, or ticket swapping activities) that may, according to some embodiments, include pre-event ticket negotiation and exchanging activities in which a ticketholder indicates a willingness to engage in negotiations to exchange one or more tickets for a ticketed event for one or more other tickets for that event or another event or for other tickets. In some instances, the negotiations for performing the exchange may include providing a ticket holder willing to engage in an exchange with additional incentives. These incentives may be paid for by the other exchanging party.

In various circumstances, a user of a ticket exchange system may indicate a willingness to exchange (swap or flip) at least one ticket for another ticket, such as a lower value ticket or another ticket in the same area. To reward a ticket holder for their exchanging their previously purchased ticket(s), a ticket holder may also be provided with incentives, which, in some instances, the ticket holder may review and then decide if they would like to proceed with the ticket exchange. In some instances, this compensation may include a high-value ticket for multiple lower value tickets, a low value ticket for a high value ticket for an additional cost, multiple low value tickets for a high value ticket, a ticket for another ticket in an even swap or flip, or one or more tickets for one or more other tickets, money, credit, goods and/or services.

Although many of the examples described herein are discussed in the context of exchanging (sometimes referred to herein as swapping or flipping) tickets, it will be appreciated by one skilled in the art that the systems and methods described herein may be applied to exchanging of any goods and/or services. For example, a user of an exchange system may be provided with the ability to exchange for a good or service other than or in addition to a ticket (e.g., credit or gift card to an affiliate of the ticketing marketplace, a credit/coupon for a concession at a venue, a credit/coupon for a parking pass at a venue, a voucher for an experience at a venue, a credit for future purchases at the ticketing marketplace) for another variety of goods or services other than a ticket. The system and/or swap-enabled users of the system may generate exchange offers that may be provided to a user of the system. In these and other embodiments, the system may generate the exchange offers for the user of the system based on preferences of the swap-enabled users and/or the user of the system.

While the various examples disclosed herein focus on particular aspects regarding the online sale, purchase and/or (sometimes referred to herein as swapping or flipping) of tickets, it will be understood that the various inventive principles and embodiments disclosed herein may be applied to other types of ticketed applications and arrangements as well. For example, a ticket exchange that is performed on a closed or proprietary computing system may utilize one or more of the aspects and features found in the various systems and methods provided whereby the transaction is originated, communicated, messaged, alerted, notified, tracked, recorded, arranged, or otherwise facilitated by the system or method.

Reference throughout the specification to "various embodiments," "some embodiments," "one embodiment," "an embodiment," "various examples," "one example," "an example," or "some examples" means that a particular feature, structure, or characteristic described in connection with the embodiment or example is included in at least one embodiment. Thus, appearances of these are not necessarily all referring to the same embodiment. Furthermore, the particular features, structures or characteristics may be combined in any suitable manner in one or more embodiments.

According to an embodiment, a computer program product may comprise a non-transitory machine readable medium. The non-transitory machine readable medium may have computer readable and executable code for instructing one or more processors to perform any of the methods disclosed herein.

Beginning with FIG. 1, some embodiments of a computing system are adapted for implementing the selection and purchase of tickets for ticketed events and/or the exchange of tickets for ticketed events is illustrated in block diagram format. As shown, a computing system 100 may comprise or implement a plurality of servers and/or software components that operate to perform various methodologies in accordance with the described embodiments. Example servers may include stand-alone and enterprise-class servers operating a server OS such as a MICROSOFT® OS, a UNIX® OS, a LINUX® OS, or any other suitable server-based OS. It may be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Computing system 100 may include, among various devices, servers, databases and other elements, a client 102 that may comprise or employ one or more client devices 104, such as a laptop, a mobile computing device, a PC, and/or any other computing device having computing and/or communications capabilities in accordance with the described embodiments. In particular, it is contemplated that client devices 104 may include a cellular telephone, including a smart phone capable of performing a variety of computing functions and communicating functions or other similar mobile device that a user may carry on or about his or her person and access readily.

Client devices 104 generally may provide one or more client programs 106, such as system programs and application programs to perform various computing and/or communications operations. Example system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, iOS, and others), device drivers, programming tools, utility programs, software libraries, application programming interfaces (APIs), and so forth. Example application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) application (e.g., GPS, mapping, directions, point-of-interest, locator), a proprietary ticketing application specifically designed to assist with the purchase, transfer, and sale of event tickets, and so forth. One or more of client programs 106 may display various graphical user interfaces (GUIs) to present information to and/or receive information from one or more of client devices 104.

Herein, the user interfaces 502 and 702 shown in FIGS. 5-12 are examples of graphical user interfaces which may presented to a first and second user via the mobile devices 500 and 700, which in turn, are examples of client devices 104 that may be used by users to communicate with network-based system 110. Further, the network-based system 110 may be collectively referred to herein as a ticketing marketplace, which is capable of communicating with the client device(s) 104.

As shown, client 102 may be communicatively coupled via one or more networks 108 to a network-based system 110. Network-based system 110 may be structured, arranged, and/or configured to allow client 102 to establish one or more communications sessions with network-based system 110 using various client devices 104 and/or client programs 106. Accordingly, a communications session between client 102 and network-based system 110 (e.g., a communications session for negotiating the exchange, sale, and/or purchase of tickets for a ticketed event) may involve the unidirectional and/or bidirectional exchange of information and may occur over one or more types of networks 108 depending on the mode of communication. In some instances, this communication may involve facilitating the communication between one or more clients 102 via the networks 108. While the embodiment of FIG. 1 illustrates a computing system 100 deployed in a client-server operating environment, it is to be understood that other suitable operating environments and/or architectures may be used in accordance with the described embodiments.

Data and/or voice communications between client 102 and the network-based system 110 may be sent and received over one or more networks 108 such as the Internet, a WAN, a WWAN, a WLAN, a mobile telephone network, a landline telephone network, a VoIP network, as well as other suitable networks. For example, client 102 may communicate with network-based system 110 over the Internet or other suitable WAN by sending and or receiving information via interaction with a web site, e-mail, IM session, and/or video messaging session. Any of a wide variety of suitable communication types between client 102 and network-based system 110 may take place, as will be readily appreciated. In particular, wireless communications of any suitable form may take place between client 102 and network-based system 110, such as that which often occurs in the case of mobile phones or other personal mobile devices.

In various embodiments, computing system 100 may include, among other elements, a third party 112, which may comprise or employ a third-party server 114 hosting a third-party application 116. In various implementations, third-party server 114 and/or third-party application 116 may host a web site associated with or employed by a third party 112. For example, third-party server 114 and/or third-party application 116 may enable network-based system 110 to provide client 102 with additional services and/or information, such as additional ticket inventory. Third-party server 114 and/or third-party application 116 may provide network-based system 110 and/or client 102 with email services and/or information, social networking services and/or information, travel services and/or information, purchase services and/or information, or other online services and/or information.

In one embodiment, third party server 114 may include a social networking server that hosts a user's social network account. In another embodiment, third party server 114 may include an email server that hosts a user's email account. In some embodiments, one or more of client programs 106 may be used to access network-based system 110 via third party 112. For example, client 102 may use a web client to access and/or receive content from network-based system 110 after initially communicating with a third-party web site hosted by third party server 114.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online marketplace and/or ticket fulfillment services to users that access network-based system 110. In various embodiments, client 102 may communicate with applications servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104 and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, and so forth, and messaging server 126 may provide a messaging interface to enable access by client 102 and/or third party 112 to the various services and functions provided by application servers 130.

When implemented as an online ticketing marketplace, application servers 130 of network-based system 110 may provide various online marketplace and ticket fulfillment services including, for example, account services, buying services, selling services, listing catalog services, exchanging services, swapping services, delivery services, payment services, gathering services, fraud services, intelligent decision-making services, gathering services, and notification services. Application servers 130 may include an account server 132, a selling server 134, a buying server 136, a listing catalog server 138, a dynamic content management server 140, a payment server 142, a notification server 144, and/or a delivery server 146 structured and arranged to provide such online marketplace and ticket fulfillment and/or exchange services.

Application servers 130, in turn, may be coupled to and capable of accessing one or more databases 150 including a subscriber database 152, an active events database 154, and/or a transaction database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
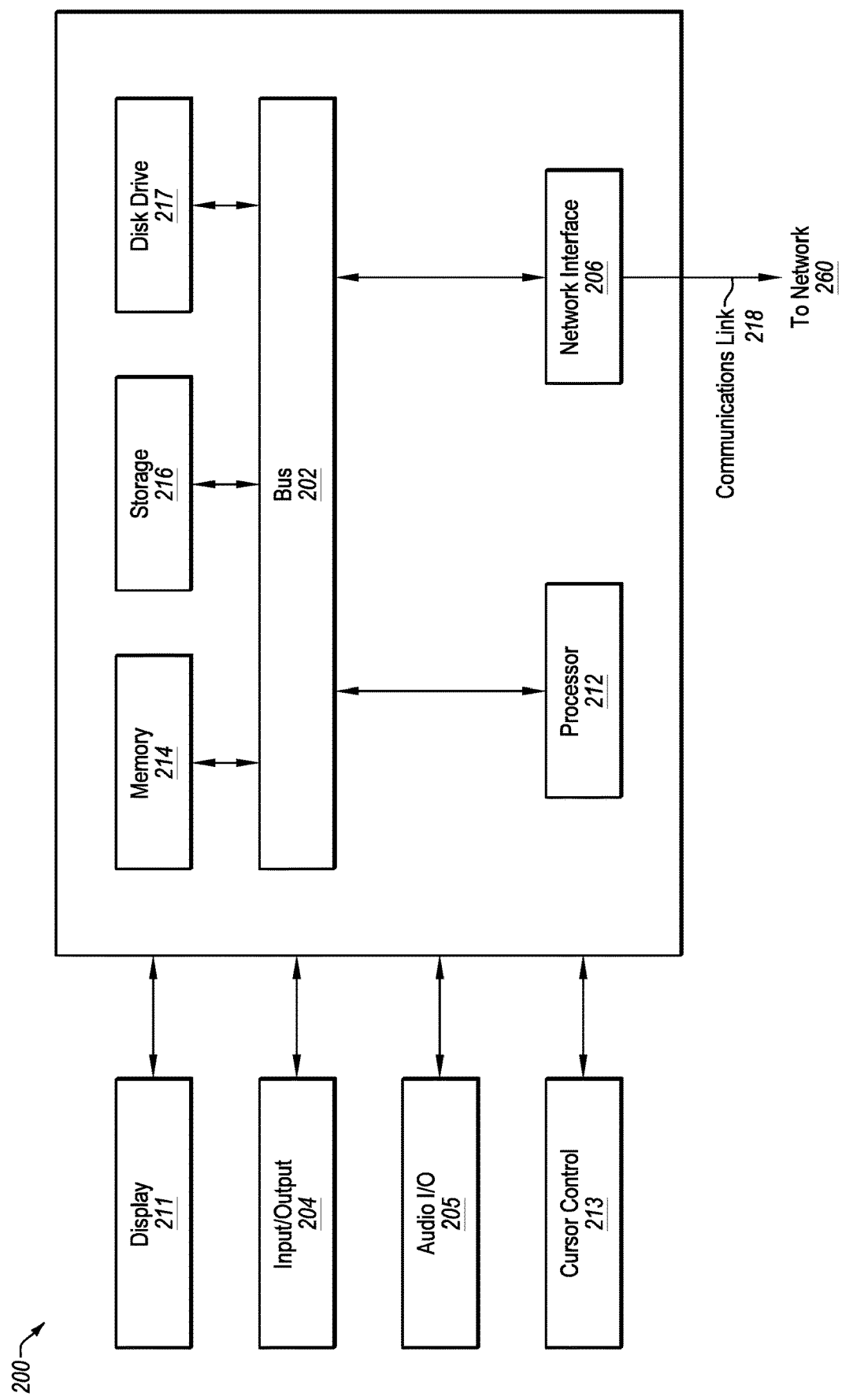
FIG. 2 is a block diagram of an illustrative computer system suitable for implementing on one or more devices of the computing system in FIG. 1 according to an embodiment.

Continuing with FIG. 2, an example of a computer system 200 suitable for implementing on one or more devices of the computing system in FIG. 1 is depicted in block diagram format. In various implementations, a device that includes computer system 200 may comprise a personal computing device (e.g., a smart or mobile phone, a computing tablet, a personal computer, laptop, PDA, Bluetooth device, key FOB, badge, wearable computing devices, such as smart watches and glasses, etc.) that is capable of communicating with a network. The ticket provider and/or a payment provider may utilize a network computing device (e.g., a network server) capable of communicating with the network. It should be appreciated that each of the devices utilized by users, ticket providers, and payment providers may be implemented as computer system 200 in a manner as follows.

Computer system 200 may include a bus 202 or other communication mechanism for communicating information data, signals, and information between various components of computer system 200. Components include an input/output (I/O) component 204 that processes a user action, such as selecting keys from a keypad/keyboard, selecting one or more buttons or links, etc., and sends a corresponding signal to bus 202. I/O component 204 may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, a venue server, an email server, a social networking server, other third-party servers, and/or a payment provider server via a network. In various embodiments, such as for many cellular telephone and other mobile device embodiments, this transmission may be wireless, although other transmission mediums and methods may also be suitable. A processor 212, which may be a microcontroller, digital signal processor (DSP), or other processing component, processes these various signals, such as for display on computer system 200 or transmission to other devices over a network 260 via a communication link 218. Again, communication link 218 may simply be a wireless communication form in some embodiments. Processor 212 may also control transmission of information, such as cookies or IP addresses, to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in non-transitory machine-readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement a mechanism enabling the negotiation between a ticket holder and a potential ticket holder for an exchange or a swapping operation for goods and/or services such as tickets and/or additional forms of compensation.

Figure 3:
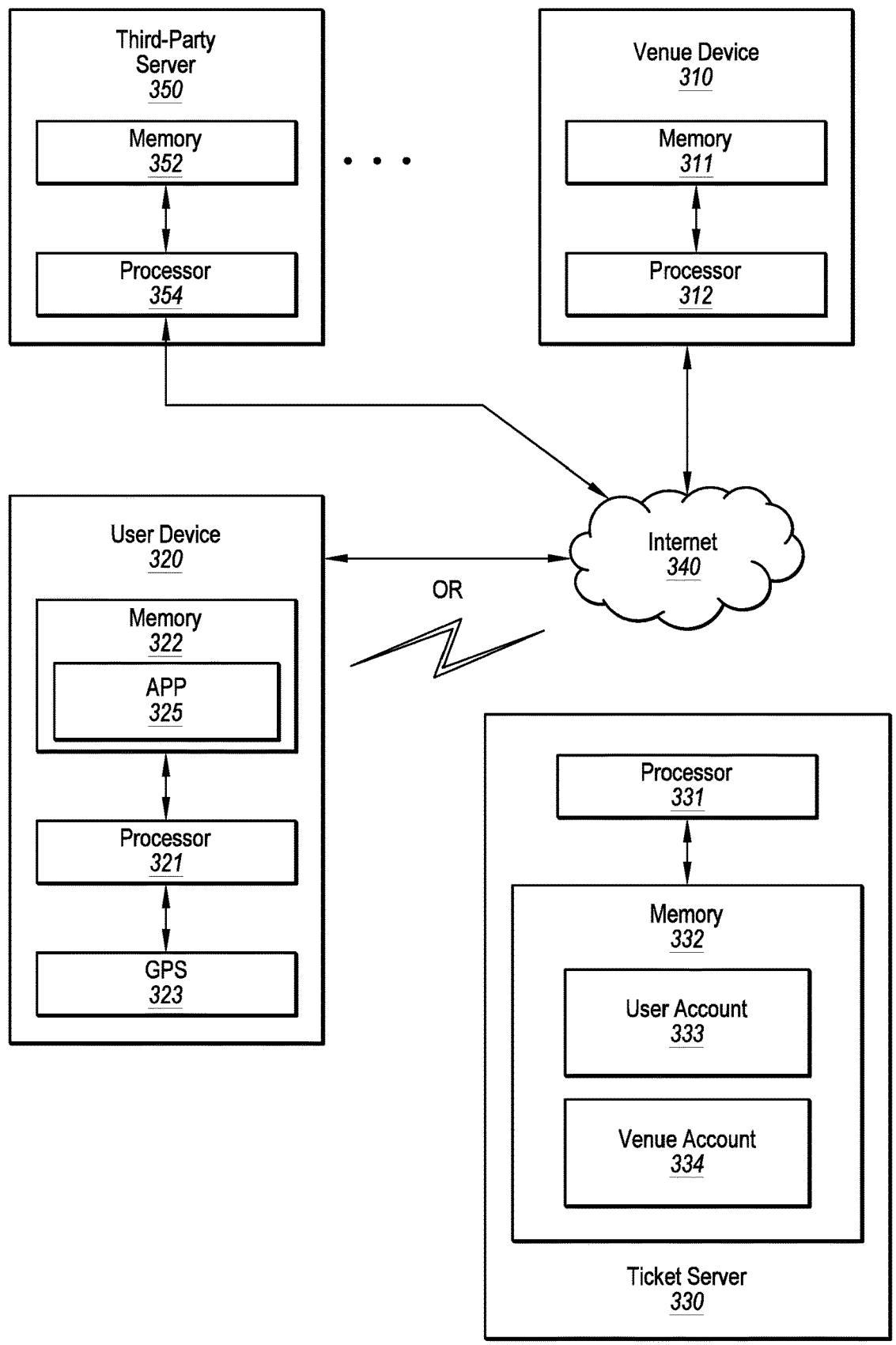
FIG. 3 is a block diagram of an illustrative system for facilitating exchanging of tickets for ticketed events according to an embodiment.

FIG. 3 is a block diagram showing a ticket selection and purchase system that may be used to facilitate exchange operations such as ticket exchange and negotiation operations, according to an embodiment. As shown in FIG. 3, a ticket server 330 may be in communication with one or more user devices such as user device 320, one or more venue devices such as a venue device 310, and one or more third-party servers such as a third-party server 350.

In some embodiments, a venue device such as venue device 310 may be present at each of a plurality of different event venues (e.g., stadiums, theaters, arenas, amphitheaters, or other venues at which ticketed events are held). Venue device 310 may provide information regarding events scheduled to occur at a particular venue and regarding seating at that venue. In some embodiments, venue device 310 may provide the information to ticket server 330. Ticket server 330 may obtain information regarding events scheduled to occur at various venues and information regarding seating at the various venues from one or more venue devices 310, from other sources, or ticket server 330 may have a database of event information and venue information independent of any interaction with a venue device. Ticket server 330 may, for example, be an implementation of network-based system 110 of FIG. 1.

Venue device 310 may be a computer, a server, a computing tablet, or a mobile device, as examples. Venue device 310 may have processing circuitry such as a processor 312 and storage such as a memory 311. Processor 312 may execute a software program stored in memory 311 for providing information regarding events scheduled to be at the venue and regarding seating at the venue for each scheduled event. Venue device 310 may provide the information to the ticket server and/or to a user device such as user device 320.

Venue device 310 may be disposed at the venue. However, this is merely illustrative. If desired, venue device 310 may be disposed at a location other than the venue. Each venue may have a dedicated venue device 310 or a plurality of different venues may share a common venue device 310. For example, co-owned venues may share a common venue device 310.

In some embodiments, venue device 310 may be omitted if ticket server 330 has the information needed for buying, selling, and exchanging of tickets. For example, ticket server 330 may have a database of available tickets and information about the tickets and venues that enables ticket server 330 to provide the necessary information to a user for purchasing and/or exchanging tickets for events at venues.

Third-party servers 350 may include, for example, a social media server that hosts one or more social networking accounts (e.g., a social networking account for a user of user device 320), an email server that hosts email services (e.g., an email account for the user), and/or another server. A user may use user device 320 to access ticket server 330 to select and purchase tickets for ticketed events from ticket server 330, to sell tickets for ticketed events, to purchase tickets for events at a venue and/or exchange (swap) tickets or other goods and/or services (as examples).

Third-party server 350 may be a computer, a server, a computing tablet, or a mobile device, as examples. The third-party server 350 may have processing circuitry such as a processor 354 and storage such as a memory 352.

In one embodiment, the third party server(s) 350 may be omitted if ticket server 330 has the information needed for exchanging tickets. For example, ticket server 330 may have a database of purchases and/or user device information gathered from user device 320 that indicates tickets the user has purchased, interests of the user, calendar information of the user, travel information of the user, purchase history information of the user, or other user or ticket, event, venue, artist, team or other information associated with the context in which the tickets are bought and sold and/or other information regarding the user such as social media interactions of the user, location of the user, web interactions of the user, among other information about the user.

A user (e.g., a potential ticket swapper) may use a device such as user device 320 to shop online for available tickets and/or exchange purchased tickets for one or more events. User device 320 may be a mobile device such as a cellular telephone, a tablet computer, a laptop computer, a smart device, or another portable computing device. User device 320 may be a non-mobile device such as a home (land line) telephone, a desktop computer, an interactive set top box, or the like. User device 320 may be any device or combination of devices that facilitate online ticket purchasing and/or exchanging. User device 320 may, for example, be an implementation of client device 104 of FIG. 1.

User device 320 may have a processor 321, a memory 322, a global positioning system component (GPS) 323 and/or other suitable device components. Processor 321 may execute an application such as an app 325 that facilitates the ticket selection, purchase, and/or exchange methods disclosed herein. App 325 may be stored in a memory 322. App 325 may provide a graphical user interface (GUI) for the user when the user is selecting, purchasing, and/or exchanging tickets or other goods and/or services online. If desired, app 325 may be a dedicated ticket purchasing app. However, this is merely illustrative. In some configurations, app 325 may be part of another app, or associated with another app, such as a payment app.

User device 320 may communicate with venue device 310, third-party server 350, and/or ticket server 330 via a network, such as the Internet 340. User device 320 may communicate with the Internet via either a wired connection or a wireless connection. App 325 may be configured to transmit to ticket server 330 location information of user device 320. For example, ticket server 330 may have access to location information for a user based on location data from GPS 323.

Ticket server 330 may be operated by an online ticket seller such as StubHub, Inc. Ticket server 330 may facilitate online ticket sales and/or online ticket exchanges (sometimes referred to herein as ticket swaps). Ticket server 330 may include processing circuitry such as a processor 331 in communication with storage such as a memory 332. Processor 331 may include one or more processors. Processor 331 may access accounts such as a user account 333 and/or a venue account 334 that are stored in memory 332. User account 333 may include information regarding the user (e.g., identification information, preferences, account numbers, purchase history, social network contacts, email contacts, email account permissions, social media account permissions, purchased-ticket event information, attended event information, etc.). Venue account 334 may include information regarding the venue (e.g., information regarding events, seating, venue location, and other venue features). Memory 332 may be separate from the ticket server and may be used to store any number of user accounts 333 and venue accounts 334. Memory 332 may be distributed, e.g., have portions thereof disposed at a plurality of different locations. Other accounts may also be accessible by processor 331, such as accounts of users selling or exchanging tickets that include ticket details, such as price, quantity, location, and event information, and financial information that enable funds to be deposited into or drawn from seller accounts when their tickets are sold or exchanged.

Ticket server 330 may include one or more servers located at one or more locations. Thus, the ticket server 330 may be geographically and operationally distributed if desired. Ticket server 330 may be part of another system, such as a payment provider system. Venue device 310 and/or third-party server 350 may communicate with ticket server 330 over a wired or wireless connection such as via a network, such as Internet 340. Venue device 310 and/or third-party server 350 may communicate with a plurality of different ticket servers 330. Ticket server 330 may communicate with a plurality of different venue devices 310 and/or third-party servers 350. A plurality of different ticket servers 330 may communicate among themselves and may be considered herein as being the same as a single ticket server 330. The user may operate user device 320 to interact with ticket server 330 so that the user may select, purchase, sell and/or swap tickets online.

Ticket server 330 may communicate with venue device 310 to obtain information about the venue. For example, ticket server 330 may communicate with venue device 310 to obtain information regarding the scheduling of events at the venue and regarding features of the venue. The features of the venue may be dependent upon the events of the venue, e.g., the features of the venue may vary from event to event. Generally, venue device 310, user device 320, third-party server 350, and ticket server 330 may perform functions discussed herein. That is, at least to some extent, a function that is discussed herein as being performed via a particular one of these devices may be performed by a different one of these devices, by a combination of these devices, and/or by other devices.

Ticket server 330 and/or venue device 310 may be configured to include real-time information. For example, venue device 310 may include real-time information regarding a venue and configuration of seating at the venue. In these and other embodiments, venue device 310 may provide information in real-time to ticket server 330. As another example, ticket server 330 may include real-time information regarding a status of tickets for the venue, such as which tickets at the venue are available to purchase.

Venue device 310, user device 320, third-party server 350, other mobile devices, and ticket server 330 may communicate with one another via a network, such as the Internet 340, or with one another via one or more networks, such as local area networks (LANs), wide area networks (WANs), cellular telephone networks, and the like. Venue device 310, mobile devices such as user device 320, third-party server 350, ticket server 330, and other devices may communicate with one another, at least partially, via one or more near field communications (NFC) methods or other short range communications methods, such as infrared (IR), Bluetooth, WiFi, and WiMax.

When a user wishes to shop for tickets online, resell tickets online, check in to an event venue online, access electronic tickets online, or exchange tickets online (as examples), the user may open an online ticket seller's website or may access the ticket seller using an application such as app 325. The user may open the ticket seller's website using user device 320, for example. The ticket seller's website may be hosted on ticket server 330, venue device 310, or on any other server or device.

Figure 4:
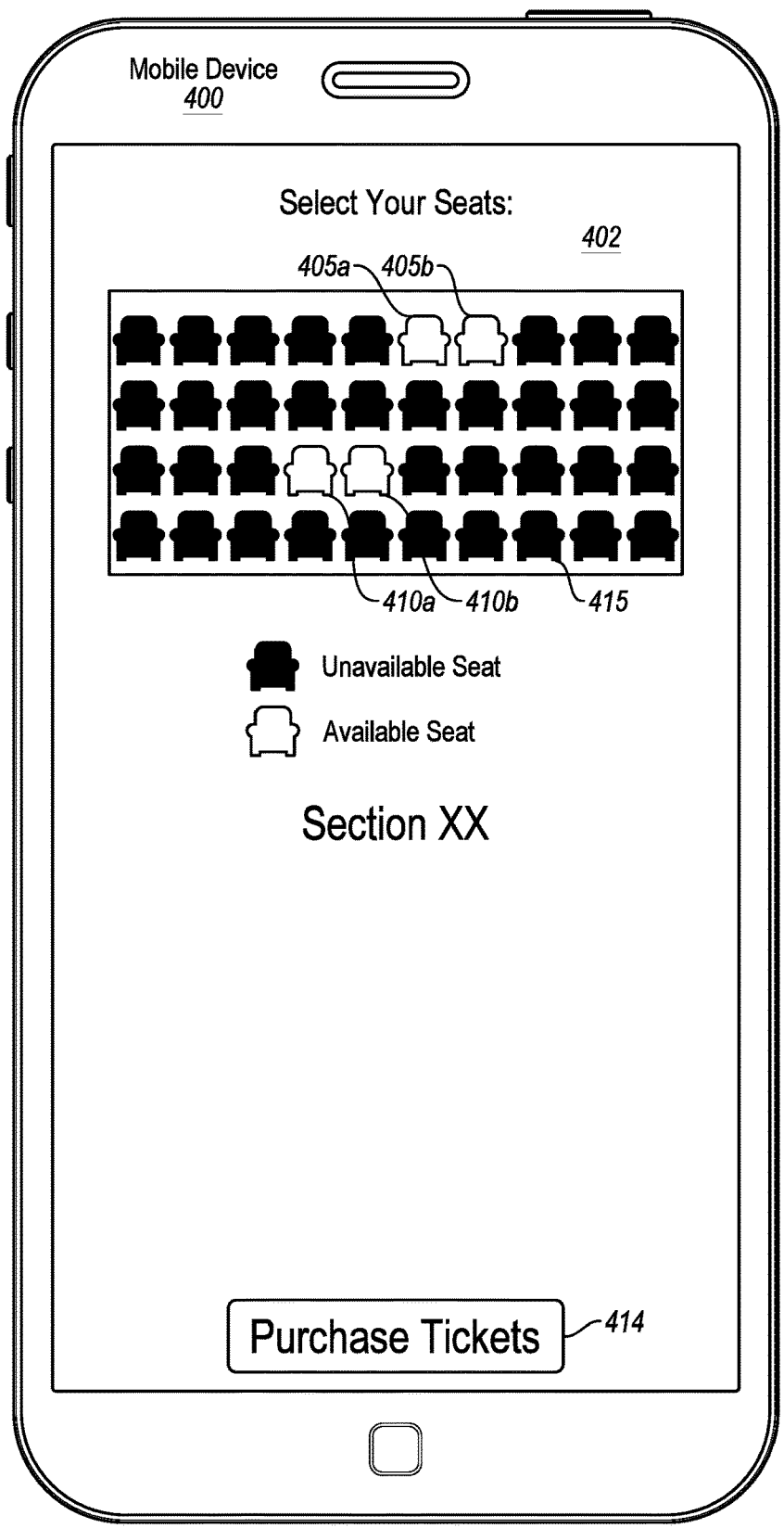
FIG. 4 is a diagram of an illustrative user device showing how a user may purchase tickets using a ticketing system currently available in the art.

FIG. 4 is a diagram of a seat selection user interface 400 which may be presented to a potential ticket buyer, in accordance with a ticketing platform which may be currently known in the art. As shown in FIG. 4, the user interface 400 includes a diagram which generally corresponds to the seating available at a venue for a particular event. It should be noted that in the example shown in FIG. 4, only a subset or small selection of the overall number of seats in a particular venue may be shown, such that only a particular section or area of the seats in the venue are shown at a particular time so as to facilitate the display and selection of seats available for purchase.

In the user interface 400 shown in FIG. 4, the diagram of seats at the venue are displayed as being either "available" or "unavailable" for purchase by the user. In some instances, the term "unavailable" is used to indicate tickets which have been previously purchased, temporarily or permanently reserved, or which are otherwise not authorized for sale by the ticketing platform. Conversely, the term "available" may be used to describe tickets which are available for sale or resale by the ticketing platform. As shown in FIG. 4, seats 405a, 405b, 410a, and 410b are "available" for purchase, whereas each of the remaining seats 415 are "unavailable" for purchase.

In some instances, a user may desire to purchase a group of seats together so as to ensure that their group of friends or family can enjoy the event while sitting together. One difficulty such a user may encounter while utilizing the user interface 400 shown in FIG. 4, however, is that there are no remaining groups of "available" tickets for a group larger than two. More particularly, although the user may desire to purchase a group of 4 adjacent seats, no such group of 4 adjacent seats is available for purchase using the user interface 400. In such instances, the user must either a) locate a group of four adjacent tickets in another, less desired section of the venue (if available), b) use another, more tedious route to obtain the desired group of tickets, such finding another ticket seller who has additional tickets for sale in the desired group size, or c) elect to purchase the two separate groups of available seats 405a, 405b and 410a, 410b and split their party into two smaller groups. As may be understood, each of these options may be undesirable for a potential ticket purchaser who wishes to experience the event with a group of their friends or family. Further, another disadvantage is that the ticketing platform operating the user interface 400 may have an excess of single or small groups of seats, which in many instances may be difficult to sell, since most potential ticket buyers are interested in attending an event with at least one other person. Without the ability to provide potential ticket buyers with a mechanism for obtaining larger groups of adjacent tickets, the ticketing platform may lose potential sales and customers.

Figure 5:
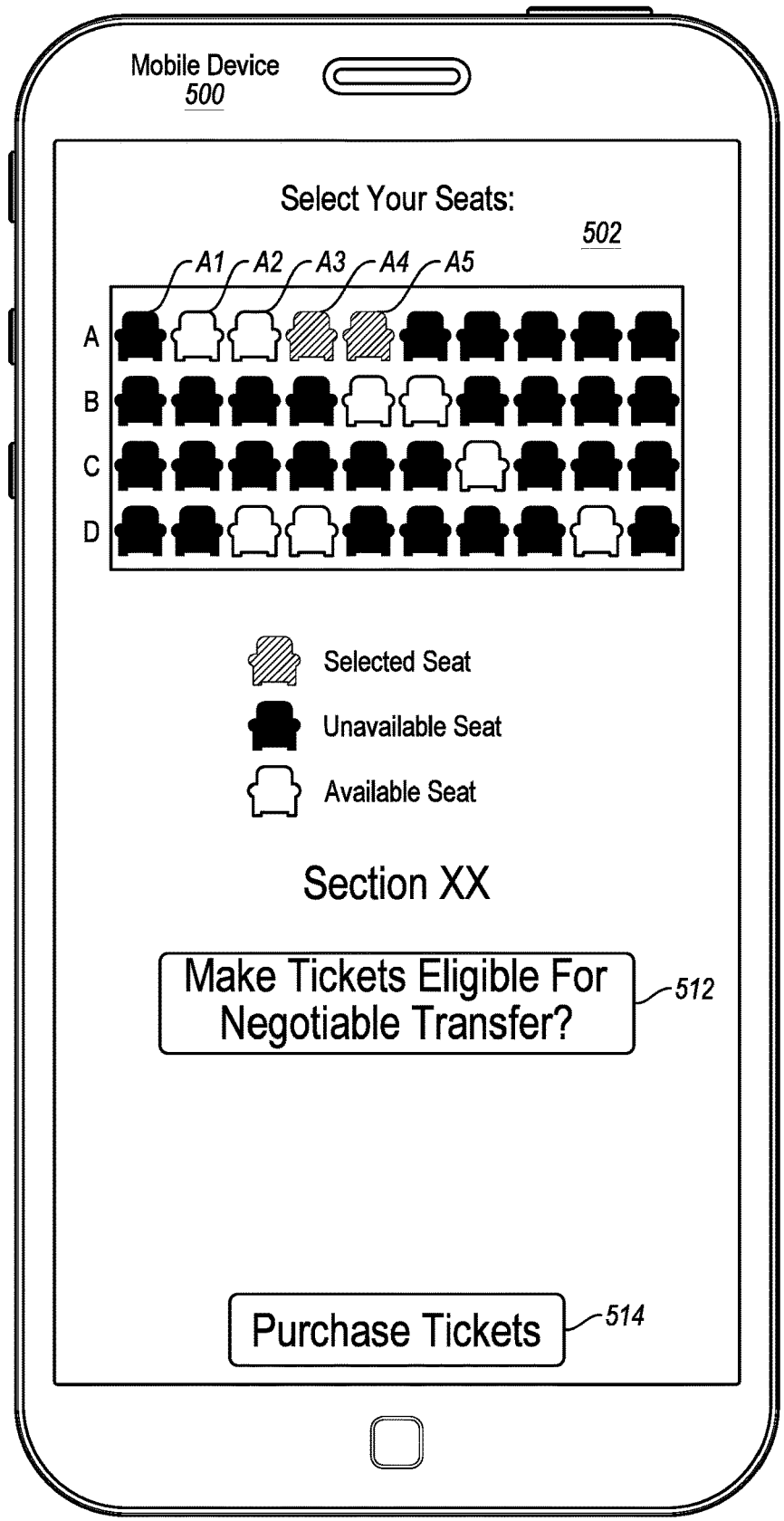
FIG. 5 is a diagram of an illustrative user device showing how a negotiable transfer may be initiated by a first user using a user device according to an embodiment.

FIGS. 5-12 illustrate diagrams of how mobile devices 500 and 700 (comprising user devices) of a first user and a second user, respectively, may be used to perform a negotiable transfer of seats between a first user and a second user according to an embodiment. More particularly, FIG. 5 is a diagram of an illustrative mobile device 500 showing how a negotiable transfer may be initiated by a first user via a user interface 502, which may be a portion of a ticketing marketplace app 325 (such as the app shown in FIG. 3) or website. For example, the user interface 502 may be displayed in the application of the ticketing marketplace which is displayed to the first user via the user device 500 as a portion of a ticketing purchase performed via the application. In another embodiment, the user interface 502 may be a portion of a ticket seller website that the first user has logged into or is otherwise generated on the display of a mobile device 500 or other device.

As is shown in FIG. 5, a first user A interacts with the user interface 502 and indicates a desire to purchase tickets A4 and A5, corresponding to seat "4" and "5" in row A in a particular section in a venue for an event. As may be understood, the user interface 502 may initially show seats A4 and A5 as being "available" for purchase by using a designated graphic or image that is designed to notify the user of the seat availability. For example, in FIG. 5, seats A2 and A3 are also illustrated as being "available," whereas seat A1 is shown as being "unavailable." As is shown in FIG. 5, upon selection and/or purchase of seats A4 and A5, the user interface 502 may cause the seats A4 and A5 in the user interface 502 to have a modified appearance, indicating the selection and/or purchase of those seats. It should be understood that a user may use any number of means for selecting the seats A4 and A5, including, but not limited to selecting the seats by clicking on a corresponding portion of a touch-screen display, entering text indicating the desired seats, and the like.

According to one embodiment, during the purchasing process, first user A is presented with the option to subject their purchased seats A4 and A5 for a negotiable transfer to another user. This may be performed a variety of methods, including any number of means which enable the first user A to select a selectable feature via the user interface 502, including a variety of graphical control elements such as selectable button 512. It should be understood that other selection means may be used, including a check-box, a radio dial button, or the like. In another embodiment, as is shown in FIG. 5, the first user A may elect to subject the seats A4 and A5 for negotiable transfer by selecting button 512 at the time of ticket purchase. Once the first user A finalizes their selection and decides whether or not to make the selected tickets eligible for negotiable transfer, the first user A may finalize their ticket selection by pressing the purchase tickets button 514.

Figure 6:
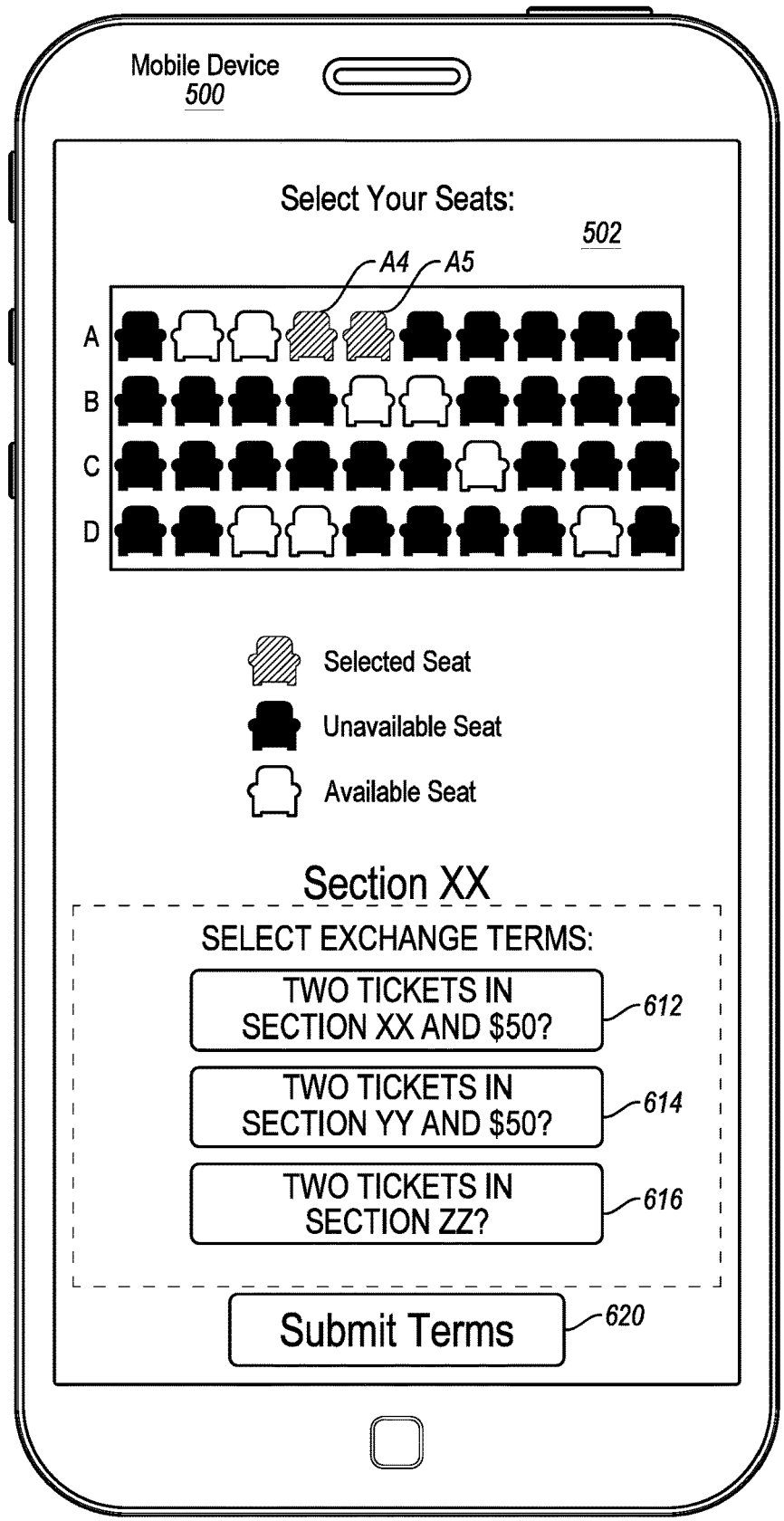
FIG. 6 is a diagram of an illustrative user device showing how exchange terms for a negotiable transfer may be selected by a first user using a user device according to an embodiment.

FIG. 6 is a diagram of an illustrative user device showing how exchange terms for a negotiable transfer may be selected by first user A using the user interface 502. More particularly, after electing to make the tickets A4 and A5 subject to negotiable transfer, the user interface 502 may prompt the first user A to select the transfer or exchange terms by providing a list or series of selectable buttons 612, 614, and 616, each of which correspond to a set exchange terms under which the first user A would be willing to trade or exchange their seats A4 and A5.

In the example shown in FIG. 6, the first user A is able to select from three separate options, including a selectable button 612 corresponding to an exchange term of two tickets in section XX along with an additional compensation of $50, a selectable button 614 corresponding to an exchange term of two tickets in section YY along with an additional compensation of $50, and a selectable button 616 corresponding to an exchange term of two tickets in section ZZ without an additional financial compensation. As may be understood, in this example, it may be assumed that tickets in section ZZ are deemed to be slightly more valuable. In some instances, this may be because the tickets in section ZZ have a better view, are closer to a stage, field of play, or the like. In this example, the first user A may use the selectable buttons 612, 614, and 616 to select any of the selectable exchange terms. Further, in this example, the selectable exchange terms may be generated or identified by the ticket server 330.

The exchange terms may be generated or identified by the ticket server 330 based on a comparison between the tickets A4 and A5 and tickets for other available seats. The comparison may be based on one or more factors, such as quality, quantity, price, user preferences, market-demand, location, and other factors that may be considered when purchasing tickets to an event. In some embodiments, a machine learning model may be generated by a machine learning algorithm, such as a neural network, random forest, or decision tree machine learning algorithm. The machine learning model may be provided the tickets A4 and A5 subject to the negotiation transfer. The machine learning model may indicate other tickets and/or other tickets and financial compensation that may be comparable to the tickets A4 and A5. In these and other embodiments, the machine learning model may output a range of other tickets. The ticket server 330 may review the tickets available for purchase from the range of tickets to select tickets for the exchange. In these and other embodiments, the machine learning model may be generated by providing the machine learning algorithm multiple different scenarios of exchange terms to learn how to select exchange terms for a given set of tickets. For example, information regarding tickets for exchange, such as the quality, quantity, location, costs, market-demand, and other information may be provided to the machine learning algorithm and one or more different exchange terms. Based on the information, the machine learning algorithm may generate the machine learning model. After generation of the machine learning model, similar information may be provided to the machine learning model regarding the tickets to be exchanged and the machine learning model may provide the exchange terms for a range of seats. The ticket server 330 may select the seats from the range of seats that are currently available for purchase and provide the exchange terms for the selected seats to the first user A.

If more than a particular number of exchange terms are available, the ticket server 330 may select the exchange terms for provided to the first user A based on an exchange history of the first user A. For example, if more than three exchange terms are available for providing to the first user A, the ticket server 330 select from exchange terms that are analogous to previous selections by the first user A. For example, if the first user A has previously selected exchange terms with additional compensation over exchange terms without additional compensation, the ticket server 330 may select exchange terms with additional compensation for providing to the first user A. In some embodiments, the machine learning model may also be generated based on preferences of a user. In these and other embodiments, the preferences of the user with respect to the exchange terms may be provided to the machine learning model to be used in the generation of exchange terms by the machine learning model. As an example, the tickets A4 and A5 may have a combined value of $200, be by an aisle, close to a bathroom, and in near a home team as preferred by the first user A. The value, location with respect to the aisle and bathroom, and the preferences of the first user A may be provided to the ticker server 330. The ticket server 330 may select two sets of tickets for exchange. Each of the sets of tickets may include by near the home team, an aisle, and bathroom. A first set of tickets may have a value of $175. A second set of ticket may have value of $200. As a result, the exchange terms for the first set of tickets may include compensation of $25. The exchange terms for the second set of tickets may not include compensation.

Although FIG. 6 illustrates a user interface 502 including the selectable buttons 612, 614, and 616 corresponding to the exchange terms generated or identified by the ticket server 330, it should be understood that other mechanisms may be used for establishing the exchange terms. In some instances, first user A may generate his or her own exchange terms by using any number of user input mechanisms, including a text input field, a user interface that enables the first user A to view a graphical interface depicting the various seating sections of the venue and select other seats and/or seating sections which they would consider as being suitable for acceptable exchange terms. Further, although in the example shown in FIG. 6 it is presumed that first user A would require exchange terms that would result in the same number of seats for the event, in some instances, the exchange terms may enable the first user A to swap or trade their previously purchased seat(s) for greater or fewer seats.

Returning to the user interface 502, it should also be understood that the first user A may be able to select more than one set of exchange terms. In this example, it is assumed that the first user A may use both selectable buttons 612 and 616 to indicate that the first user A considers two tickets in section XX and $50 or two tickets in section ZZ acceptable exchange terms. Once the first user A finalizes their selection, the first user A may use the selectable button 620 to submit the exchange terms.

Figure 7:
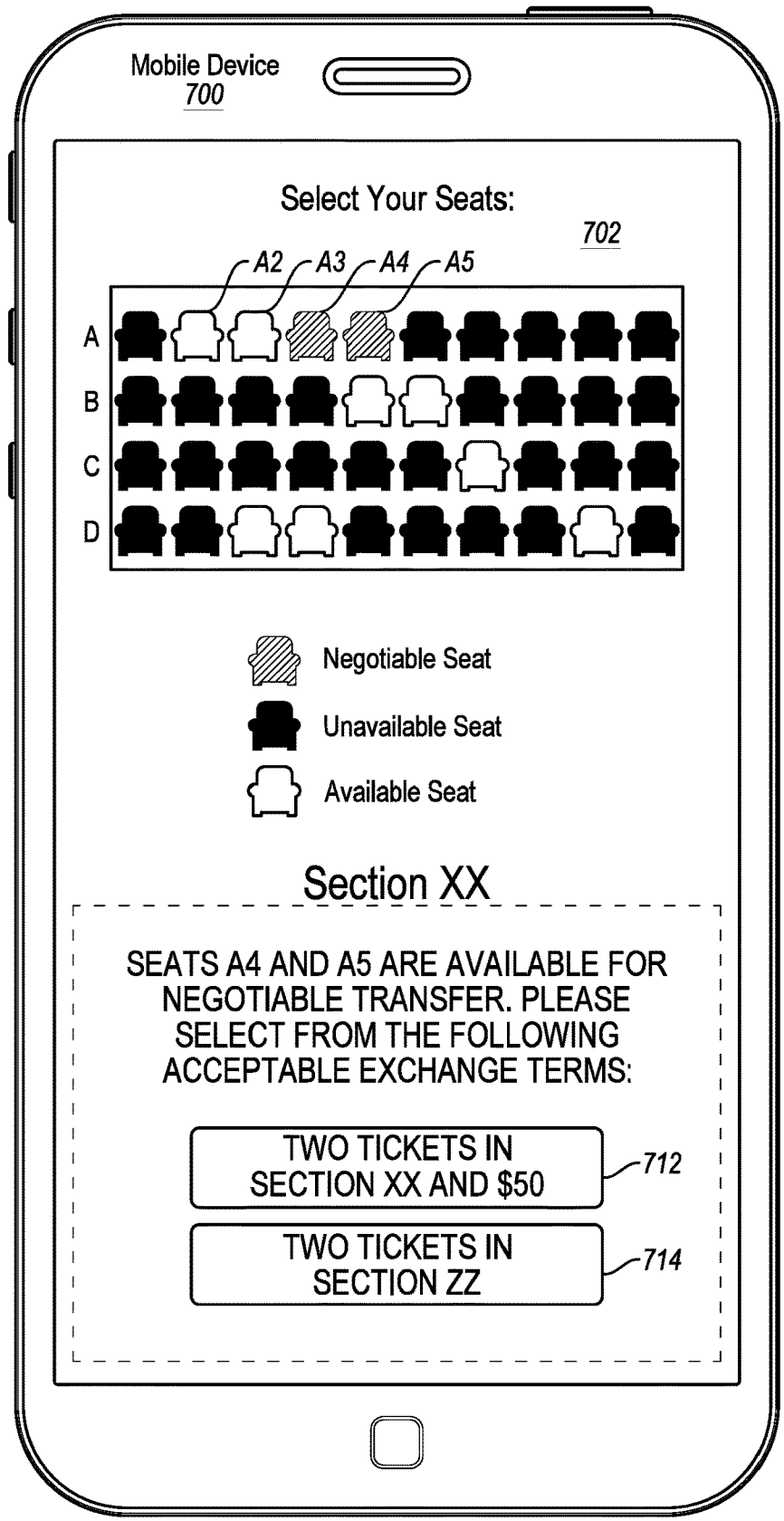
FIG. 7 is a diagram of an illustrative user device showing how a second user may utilize negotiable transfer in order to obtain tickets, including tickets previously obtained by the first user according to an embodiment.

FIG. 7 is a diagram of an illustrative mobile device 700 showing how a negotiable transfer may be subsequently performed by a second user via a user interface 702, which may be a portion of a ticketing marketplace app 325 (such as the app shown in FIG. 3) or website. In this disclosure, the second user is referred to as "second user B." For example, the user interface 702 may be displayed in the application of the ticketing marketplace which is displayed to the second user via the user device 700 as a portion of a ticketing purchase performed via the application. In another embodiment, the user interface 702 may be a portion of a ticket seller website that the second user has logged into or is otherwise generated on the display of a mobile device 700 or other device of the second user B.

As is shown in FIG. 7, the second user B interacts with the user interface 702 and indicates a desire to purchase tickets A2-A5, corresponding to seats "2," "3," "4," and "5" in row A in a particular section in a venue for an event. As may be understood, the user interface 702 may show seats A2 and A3 as being "available" for purchase directly from the ticket server 330 by using a designated graphic or image that is designed to notify the user of the seat availability. The user interface 702 may show seats A4 and A5 as being available for negotiable transfer. As is shown in FIG. 7, after selection and/or purchase of seats A4 and A5, the user interface 702 may illustrate an indication illustrating the acceptable exchange terms associated with the selected seats A4 and A5 and corresponding selectable buttons 712 and 714 which may be selected by second user B and an indication of second user B's willingness to exchange in the negotiable transfer for the selected seats A4 and A5 according to the selected exchange terms. Thus, the acceptable exchange terms associated with the selected seats A4 and A5 and corresponding selectable buttons 712 and 714 may not be shown in the user interface 702 as initially viewed by the second user B. Rather, in some embodiments, the acceptable exchange terms associated with the selected seats A4 and A5 and corresponding selectable buttons 712 and 714 may only be shown after providing an indication of interest in one or more of tickets A2-A5.

Figure 8:
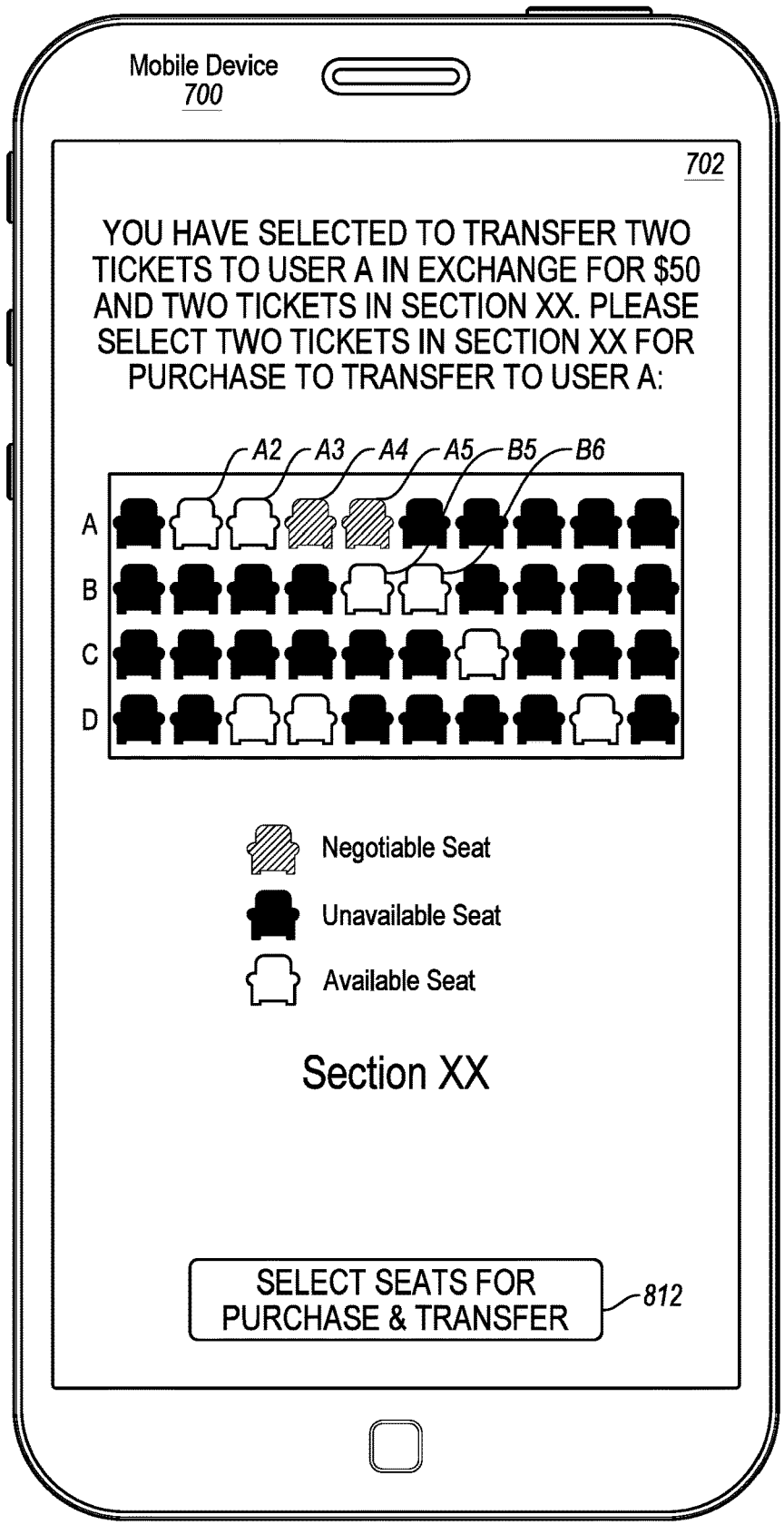
FIG. 8 is a diagram of an illustrative user device showing how a second user may select seats for negotiable transfer in order to satisfy the exchange terms for the ticket previously obtained by the first user according to an embodiment.

Upon the second user B's selection of the "two tickets in Section XX and $50" exchange term button 712 shown in FIG. 7, the user interface 702 may be updated to the display shown in FIG. 8. As is shown in FIG. 8, the user interface 702 displays a prompt to the second user B indicating that the second user B has selected to transfer two tickets to user A in exchange for $50 and two tickets in Section XX and instructing the second user B to select two tickets in Section XX for purchase by second user B, which will be subsequently transferred to first user A along with $50 in exchange for the tickets A4 and A5 previously purchased by first user A. The user interface 702 may include a display illustrating a selection of "available," "unavailable," and "negotiable" seats. In this example, the second user B may use the user interface to select tickets B5 and B6, which are illustrated as being "available," which are available for sale or resale by the ticketing platform via the ticket server 330. As may be understood, the ticketing selection process may include a variety of different embodiments, including a display of various prices for the varying seats.

The second user B may then finalize their selection of two seats B5 and B6 in Section XX by selecting the button 812, indicating a commitment of the second user B to engage in the purchase of the seats B5 and B6 for the purpose of transferring or exchanging the tickets as a portion of the terms for the negotiable exchange for the seats A4 and A5 purchased by the first user A. In some instances, the user interface 702 may be updated to display a summary of the exchange to the second user B. More specifically, the user interface 702 may illustrate that the second user B has elected to purchase seats A2 and A3 for purchase from the ticketing platform, which as described below, will be transferred to second user B. Further, the user interface 702 may illustrate that the second user B has elected to purchase seats B5 and B6 for purchase from the ticketing platform by the second user B, but as is described below, which instead of being transferred or delivered to the second user B, will be automatically transferred to the first user A, in exchange for the seats A4 and A5, which in turn, are delivered to the second user B. Upon reviewing the terms of the exchange, the second user B may then utilize a button 912 to finalize their selection.

Figure 9:
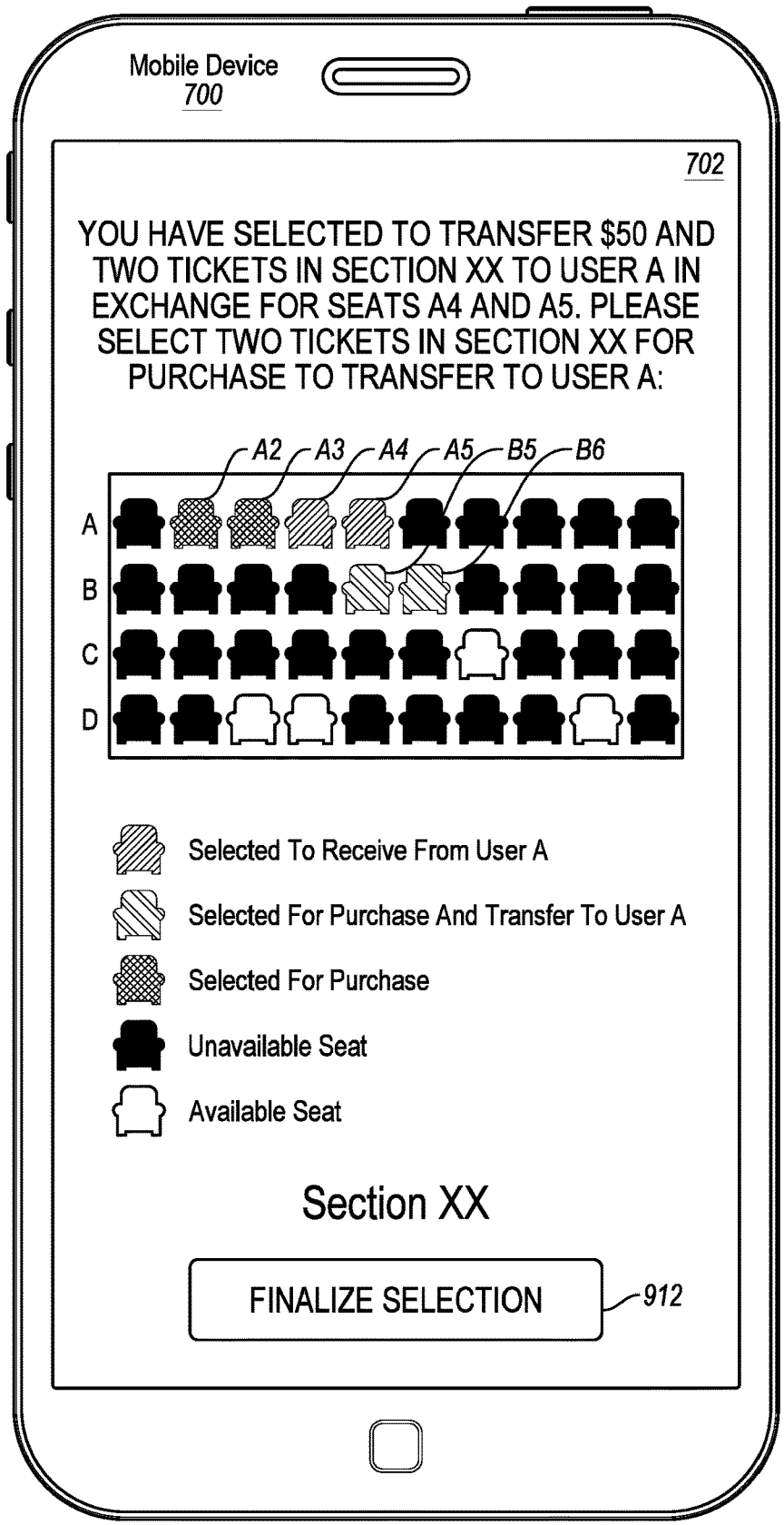
FIG. 9 is a diagram of an illustrative user device showing how a second user may confirm the selection of seats for negotiable transfer in order to satisfy the exchange terms for the ticket previously obtained by the first user according to an embodiment.
Figure 10:
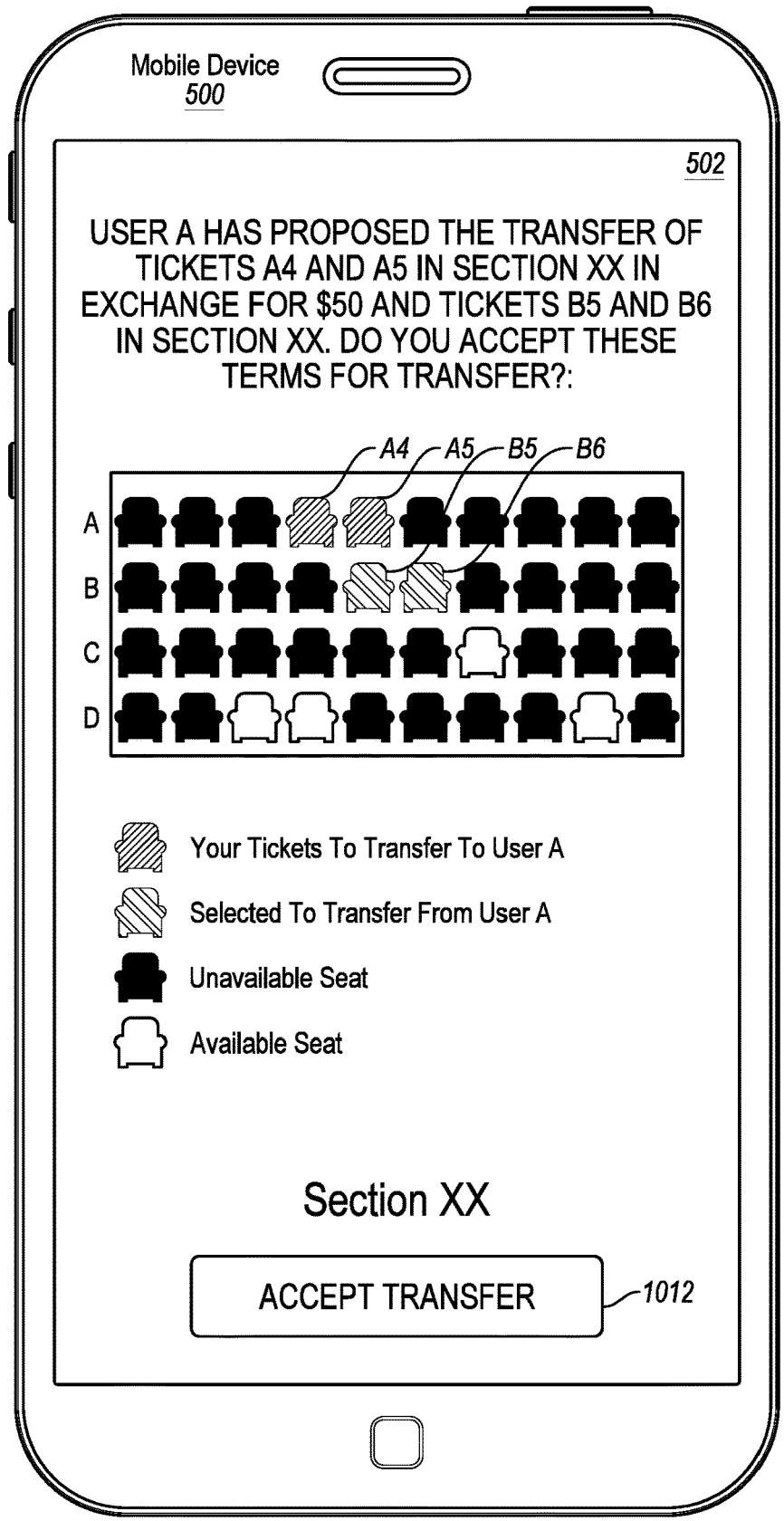
FIG. 10 is a diagram of an illustrative user device showing a request to authorize a negotiable exchange of seats between the first user and second user which may be presented to the first user according to an embodiment.

Upon finalizing their selection according to the user interface 702 shown in FIG. 9, the second user B may then be directed to another user interface for performing the purchase of the tickets A2, A3, B5, and B6 along with the additional $50 according to the negotiated exchange terms. It should be understood that any number of payment interfaces may be used in association with the user interface 702, including the ability to perform payment using a credit card, bank transfer, financial account, or the like.

In some embodiments, upon the second user B completing the purchase and the funds being deemed transferred, the terms of the negotiable exchange between first user A and second user B may be deemed to be satisfied, and the tickets A2, A3, A4, and A5 may be automatically transferred to the second user B, whereas the tickets B5 and B6 and a $50 credit or gift card are transferred to the first user A. The transfer may involve simply notifying the first user A that another user has accepted and satisfied the terms of their negotiable transfer, and as such the first user A no longer is deemed to have ownership of tickets corresponding to seats A4 and A5 and instead are being transferred ownership of tickets B5 and B6 along with the $50 credit or gift card. In some instances where the first user A has already received electronic or physical tickets corresponding to seats A4 and A5, the first user A may be notified that the scannable bar code or other ticketing data on the electronic or physical tickets they previously corresponding to seats A4 and A5 have been invalidated and will no longer grant access to the venue for the event and instead the new tickets B5 and B6 have been issued.

In other instances, the first user A may be sent a notification that the second user B has requested to engage in the negotiable transfer for the tickets corresponding to seats A4 and A5 according to the exchange terms the first user A previously submitted. In such embodiments, the first user A may be sent a notification shown in the user interface 502, which displays the location of the seats B5 and B6 which the first user A would receive in exchange for their previously purchased seats A4 and A5 so that the first user A can expressly accept the terms of the transfer. In the user interface 502, the first user A may accept the terms of the transfer via the selectable button 1012. In some instances, the first user A may be given a time period in which to accept the terms of the negotiable exchange before the offer for the exchange is deemed invalid and expired. Further, upon the first user A's acceptance of the terms of the negotiable exchange, the second user B may also be given a time period in which to complete the purchase of the tickets A2, A3, B5, B6 along with providing payment for the additional compensation of $50. If the second user B fails to complete the purchase in the allotted time period, the exchange is deemed invalid and expired. Conversely, if the second user B completes the purchase in the specified period, the terms of the negotiation are deemed to be satisfied.

Figure 11:
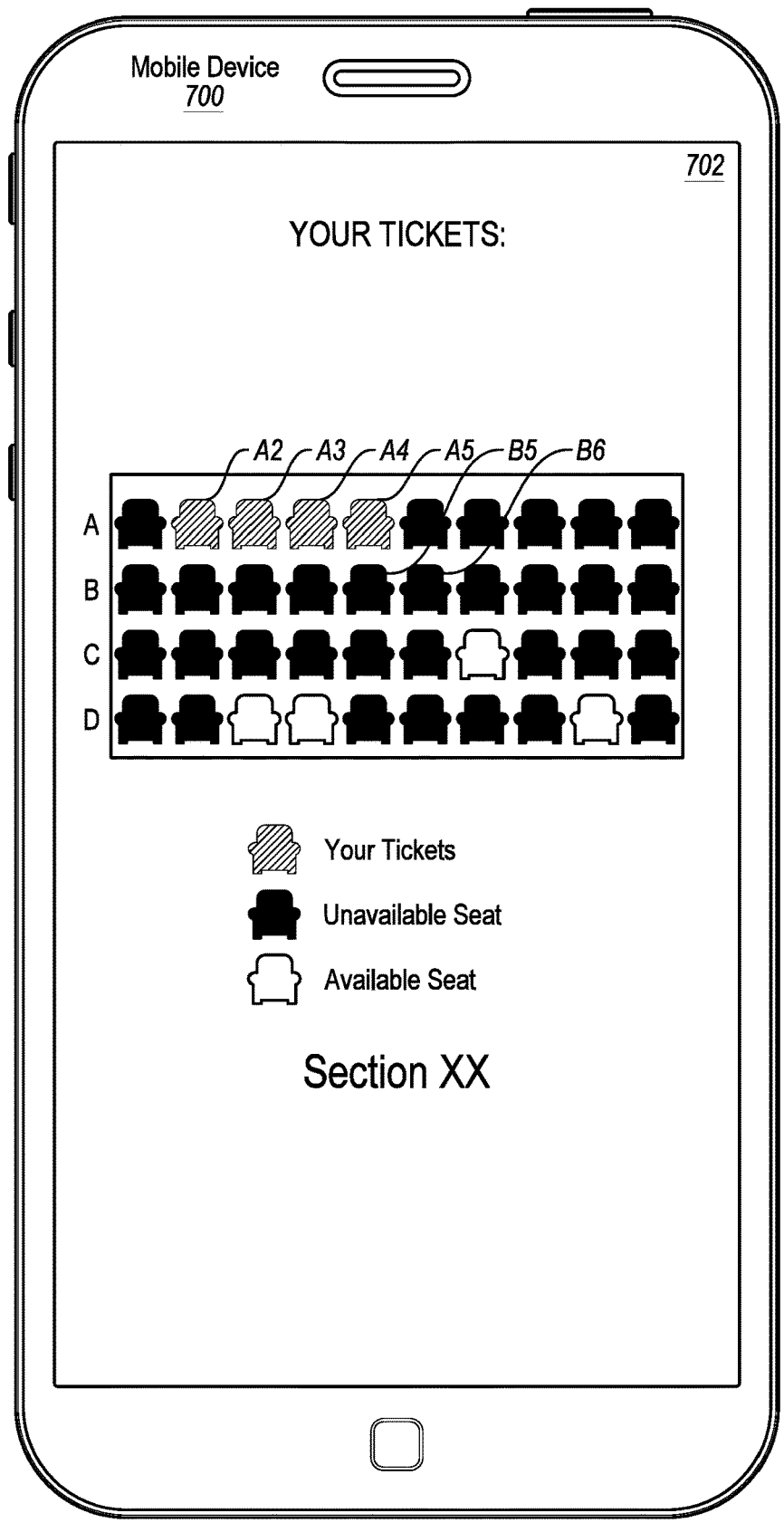
FIG. 11 is a diagram of an illustrative user device showing the resulting tickets for a second user following the successful negotiable transfer of tickets according to an embodiment.

Upon completion of the purchase of the tickets by the second user B and the negotiable exchange between the second user B and the first user A, FIG. 11 illustrates a user interface 702 providing a summary to the second user B illustrating their ownership of the group of adjacent seats A2-A5. It should be noted that in the user interface 702 shown in second user B, the seats B5 and B6 are displayed as being "unavailable" because those seats have been transferred to the first user A in exchange for the tickets A4 and A5 which have been received.

Figure 12:
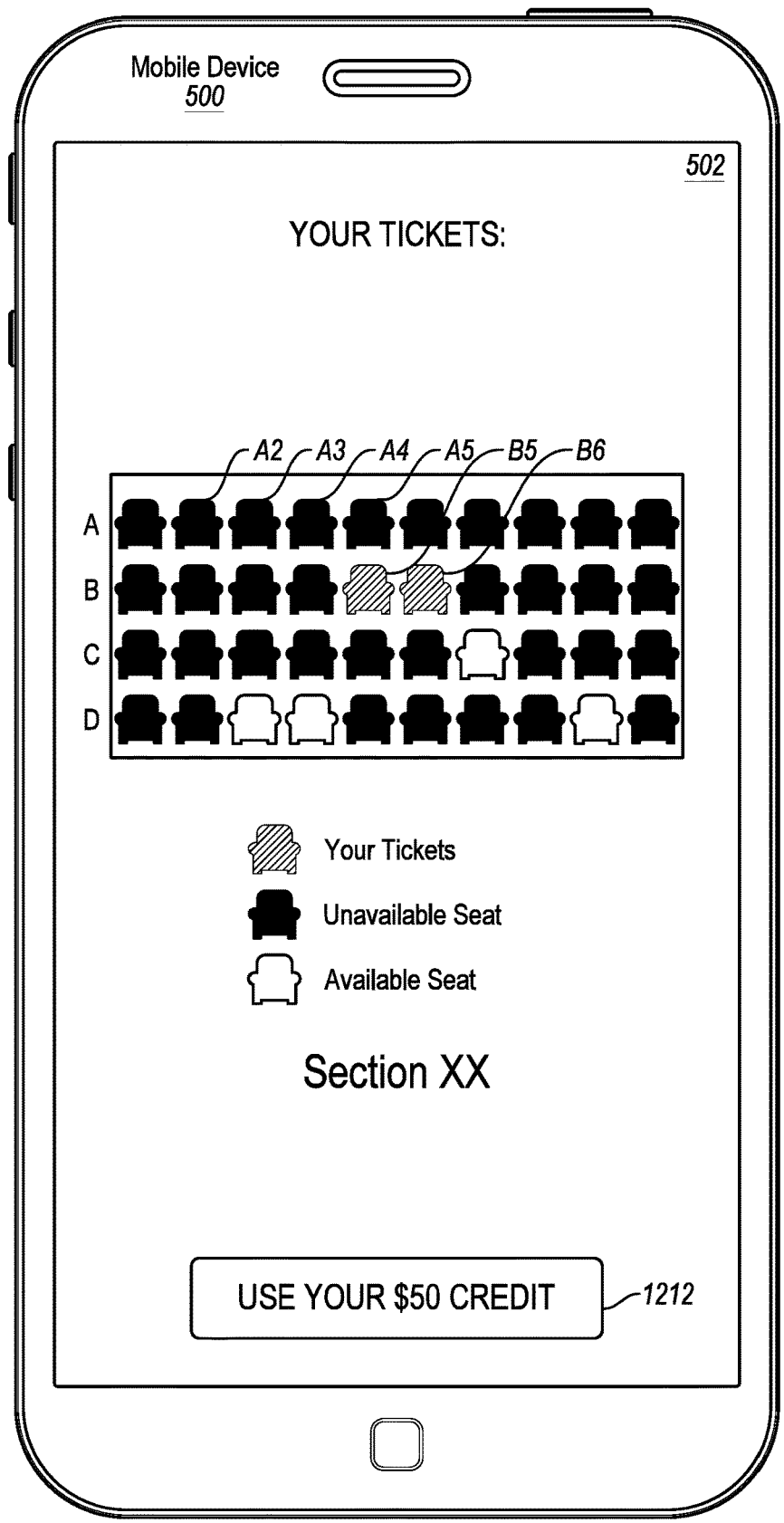
FIG. 12 is a diagram of an illustrative user device showing the resulting tickets for a first user following the successful negotiable transfer of tickets according to an embodiment.

Similarly, FIG. 12 illustrates a user interface 502 which may be displayed to the first user A upon completion of the negotiable transfer of the tickets A4 and A5 to the second user B in exchange for the tickets B5 and B6 and an additional $50 of compensation. As is shown in FIG. 12, upon the completion of the negotiable transfer, the seats A4 and A5 previously owned by the first user A are now shown as being "unavailable" since they have subsequently been transferred to the second user B, and the first user A is now shown as owning tickets B5 and B6. Further, the user interface 502 now includes a selectable button 1212 for enabling the first user A to use or redeem the $50 credit which they received as a portion of the exchange terms.

It should be understood that although the embodiments described herein illustrate exchange terms which include an exchange for seats, a credit, and/or financial compensation, other exchange terms may be used. For example, the exchange terms may include a credit or voucher for a variety of goods and services, such as for example, a food service item, a merchandise item, a parking voucher, or other amenity available at the venue. As may be understood, such exchanges would include providing one party involved in the negotiable transfer with a voucher, gift card, or coupon which will enable the user to obtain the good or service, and in return, requiring payment or compensation for the other negotiating party for the corresponding value of the good or service. Still further, the exchange terms may include gift cards or credits for merchants affiliated with the ticketing platform or further, exchanges for tickets for other events and/or showings available via the ticketing platform.

As may be understood, the embodiments describe herein enable the second user B to engage in a negotiable transfer of seats A4 and A5 from the first user A, which provides the second user B with a mechanism for obtaining a larger group of adjacent tickets than the second user B would otherwise be able to purchase from a ticketing platform currently known in the art. More particularly, by providing a mechanism for facilitating the purchase of tickets directly from the ticketing platform along with the negotiable transfer of seats between the first user A and the second user B, the embodiments described herein enable users to identify and obtain larger groupings of seats than would otherwise be possible and more particularly, enables users to perform such transactions using a convenient user interface in communication with the ticketing platform described herein. In some instances, the mechanism for facilitating the purchase of tickets directly from the ticketing platform along with the negotiable transfer of seats may be performed via a display on a mobile device, such as a smart phone, or other client device 104.

Further, although the negotiable transfer of FIGS. 4-12 are shown as being performed on mobile device(s), it should be appreciated that exchanges of the types described herein may be presented to a user or users on other types of computing devices such as non-mobile computing devices, laptop devices, tablet devices, desktop devices or the like.

Figure 13:
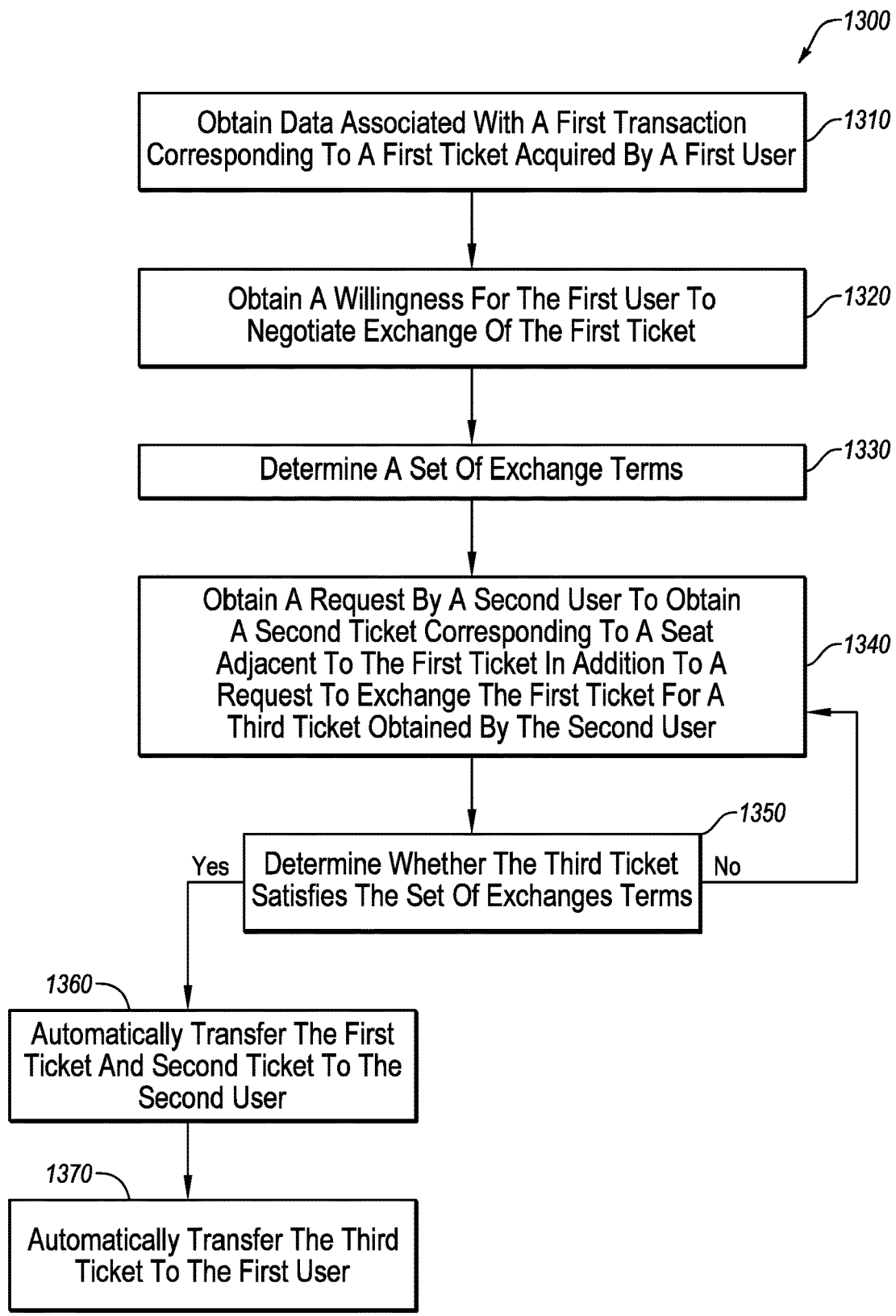
FIG. 13 is a flowchart showing an illustrative process that may be performed for the negotiable exchange of tickets according to an embodiment.

Illustrative steps 1300 that may be used in generating and/or providing a negotiation to transfer tickets are shown in FIG. 13. As discussed above, as connectivity of devices expands, there will be a variety of ways for notification, suggestion, messaging, prompting and other actions to initiate and facilitate an exchange transaction.

At step 1310, a system of the type shown in, for example, FIGS. 1 and/or 3 may obtain data associated with a first transaction corresponding to a first ticket acquired by a first user of the system. Step 1310 may include engaging in and facilitating the purchase of the first ticket with the first user. In other embodiments, step 1320 may involve the first user notifying the system that the first user is the owner of the first ticket and, in some instances, providing verification information to the system that the first ticket is valid and/or that the first user is the rightful owner.

At step 1320, the system may obtain a willingness from the first user to negotiate the exchange of the first ticket. At step 1330, the system may determine a set of exchange terms. In some embodiments, determining the set of exchange terms may involve the system determining an appropriate value for the first ticket and providing the first user with a suggested listing of suggested or available exchange terms. In other embodiments, the system may receive exchange terms which have been generated and provided by the first user to the system. The exchange terms may include an offer for the first user to exchange the first ticket for the other-valued ticket and, in some circumstances, additional compensation or at an additional cost as described herein in connection with, for example, FIGS. 4-12.

At step 1340, the system may obtain a request by a second user to obtain a second ticket corresponding to a seat adjacent to a seat corresponding to the first ticket in addition to a request to exchange the first ticket for a third ticket obtained by the second user. At step 1350, the system may determine whether the third ticket satisfies the set of exchange terms. If the system determines that the third ticket satisfies the set of exchange terms, at step 1360, the system may automatically transfer the first ticket and the second ticket to the second user and at step 1370, the system may automatically transfer the third ticket to the first user.

The system may transfer funds and/or additional tickets between the first and second user according to the exchange terms so as to compensate the first user for engaging in the negotiable transfer. The system may also enable the first user to accept the transfer of the third ticket prior to transferring the funds and/or tickets.

It should be understood that one or more of the processes and steps described in connection with FIG. 13 may be performed in any suitable order, omitted, and/or repeated any suitable number of times for facilitating the purchase, sale, resale, and/or exchange of tickets and/or other goods and/or services.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides. Although the foregoing invention has been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

The invention claimed is:

1. A method comprising:
obtaining, at a system of a ticketing marketplace, data associated with a first transaction for acquiring a first ticket by a first user;
causing, by the system of the ticketing marketplace, a device associated with the first user to display a graphical control element for the first user to select an option for a negotiable transfer of the first ticket to a second user;
obtaining, at the system of the ticketing marketplace from the graphical control element, a first indication of a willingness of the first user to negotiate an exchange of the first ticket;
determining, by the system of the ticketing marketplace, a set of exchange terms;
obtaining, at the system of the ticketing marketplace, a request by the second user to:
obtain a second ticket corresponding to a seat adjacent to a seat corresponding to the first ticket obtained by the first user, and
exchange, with the first user, a third ticket for the first ticket obtained by the first user;
determining, by the system of the ticketing marketplace, that the third ticket satisfies the set of exchange terms; and
in response to satisfaction of the set of exchange terms:
automatically transferring, by the system of the ticketing marketplace, the first ticket obtained by the first user to the second user; and
automatically transferring the third ticket to the first user.

2. The method of claim 1, wherein determining that the set of exchange terms is satisfied comprises:
obtaining, at the system of the ticketing marketplace, at least one user preference associated with the set of exchange terms; and comparing a first value of the first ticket obtained by the first user and a second value of the third ticket.

3. The method of claim 1, wherein the exchange for the third ticket and the first ticket further includes an additional item and, in response to determining that the third ticket and the additional item satisfy the set of exchange terms, the additional item is transferred to the first user.

4. The method of claim 3, wherein the additional item comprises a financial incentive, a credit for a good, or a credit for a service.

5. The method of claim 1, wherein determining that the third ticket satisfies the set of exchange terms comprises sending a notification to the device associated with the first user requesting approval of the set of exchange terms and receiving an authorization from the first user via the device associated with the first user to perform the transfer of the first ticket from the first user to the second user and the transfer of the third ticket to the first user.

6. The method of claim 1, wherein determining the set of exchange terms includes presenting a listing of potential exchange terms to the first user via the device associated with the first user.

7. The method of claim 6, wherein the listing of potential exchange terms includes a listing of multiple alternative seating sections with available seats determined to be of comparable value as the seat corresponding to the first ticket, the alternative seating sections being selectable by the first user as an indication of the willingness of the first user to exchange an available seat in one of the alternative seating sections with the seat corresponding to the first ticket.

8. A system of a ticketing marketplace, the system comprising:
   a non-transitory memory configured to store instructions;
   one or more processors configured to execute the instructions from the non-transitory memory to cause the system to perform operations, the operations comprising:
   obtaining data associated with a first transaction for acquiring a first ticket by a first user;
   causing, by the system of the ticketing marketplace, a device associated with the first user to display a graphical control element for the first user to select an option for a negotiable transfer of the first ticket to a second user;
   obtaining, from the graphical control element, a first indication of a willingness of the first user to negotiate an exchange of the first ticket;
   determining a set of exchange terms;
   obtaining a request by the second user to:
   obtain a second ticket corresponding to a seat adjacent to a seat corresponding to the first ticket obtained by the first user, and
   exchange, with the first user, a third ticket for the first ticket obtained by the first user;
   determining that the third ticket satisfies the set of exchange terms; and
   in response to satisfaction of the set of exchange terms:
   automatically transferring the first ticket obtained by the first user to the second user; and
   automatically transferring the third ticket to the first user.

9. The system of claim 8, wherein determining that the set of exchange terms is satisfied comprises:
   obtaining at least one user preference associated with the set of exchange terms; and
   comparing a first value of the first ticket obtained by the first user and a second value of the third ticket.

10. The system of claim 8, wherein the exchange for the third ticket and the first ticket further includes an additional item and, in response to determining that the third ticket and the additional item satisfy the set of exchange terms, the additional item is transferred to the first user.

11. The system of claim 10, wherein the additional item comprises a financial incentive, a credit for a good, or a credit for a service.

12. The system of claim 8, wherein determining that the third ticket satisfies the set of exchange terms comprises sending a notification to the device associated with the first user, requesting approval of the set of exchange terms and receiving an authorization from the first user via the device associated with the first user to perform the transfer of the first ticket from the first user to the second user and the transfer of the third ticket to the first user.

13. The system of claim 8, wherein determining the set of exchange terms includes presenting a listing of potential exchange terms to the first user via the device associated with the first user.

14. The system of claim 13, wherein the listing of potential exchange terms includes a listing of multiple alternative seating sections with available seats determined to be of comparable value as the seat corresponding to the first ticket, the alternative seating sections being selectable by the first user as an indication of the willingness of the first user to exchange an available seat in one of the alternative seating sections with the seat corresponding to the first ticket.

15. The system of claim 8, wherein the device associated with the first user comprises a smart device capable of communicating with the ticketing marketplace.

16. A non-transitory computer-readable medium having stored thereon machine-readable instructions that, when executed by a server device, cause the server device to perform operations comprising:
   obtaining, at a system of a ticketing marketplace, data associated with a first transaction for acquiring a first ticket by a first user;
   causing, by the system of the ticketing marketplace, a device associated with the first user to display a graphical control element for the first user to select an option for a negotiable transfer of the first ticket to a second user;
   obtaining, at the system of the ticketing marketplace and from the graphical control element, a first indication of willingness of the first user to negotiate an exchange of the first ticket;
   determining, by the system of the ticketing marketplace, a set of exchange terms;
   obtaining, at the system of the ticketing marketplace, a request by the second user to:
   obtain a second ticket corresponding to a seat adjacent to a seat corresponding to the first ticket obtained by the first user, and
   exchange, with the first user, a third ticket for the first ticket obtained by the first user;
   determining, by the system of the ticketing marketplace, that the third ticket satisfies the set of exchange terms; and
   in response to satisfaction of the set of exchange terms:
   automatically transferring, by the system of the ticketing marketplace, the first ticket obtained by the first user to the second user; and
   automatically transferring the third ticket to the first user.

17. The non-transitory computer-readable medium of claim 16, wherein determining that the set of exchange terms is satisfied comprises:
- obtaining, at the system of the ticketing marketplace, at least one user preference associated with the set of exchange terms; and
- comparing a first value of the first ticket obtained by the first user and a second value of the third ticket.

18. The non-transitory computer-readable medium of claim 16, wherein the exchange for the third ticket and the first ticket further includes an additional item and, in response to determining that the third ticket and the additional item satisfy the set of exchange terms, the additional item is transferred to the first user.

19. The non-transitory computer-readable medium of claim 18, wherein the additional item comprises a financial incentive, a credit for a good, or a credit for a service.

20. The non-transitory computer-readable medium of claim 16, wherein determining the set of exchange terms includes presenting a listing of potential exchange terms to the first user via the device associated with the first user.

* * * * *

UNITED STATES PATENT AND TRADEMARK OFFICE
CERTIFICATE OF CORRECTION

PATENT NO. : 11,093,909 B1
APPLICATION NO. : 16/810421
DATED : August 17, 2021
INVENTOR(S) : Badigannavar It is certified that error appears in the above-identified patent and that said Letters Patent is hereby corrected as shown below:

In the Claims

At Column 23, Line 4 for Claim 17: Please delete "at" after "…obtaining, …", and add --by--

Signed and Sealed this
Twelfth Day of July, 2022

Katherine Kelly Vidal
*Director of the United States Patent and Trademark Office*